• • • • • • • • US011677242B2

(12) United States Patent
Morita

(10) Patent No.: US 11,677,242 B2
(45) Date of Patent: Jun. 13, 2023

(54) POWER SUPPLY ARBITRATION DEVICE, POWER SUPPLY DEVICE, POWER CONSUMPTION DEVICE, POWER SUPPLY REMOTE CONTROLLER, POWER SUPPLY ARBITRATION METHOD, AND POWER SYSTEM

(71) Applicant: SONY CORPORATION, Tokyo (JP)

(72) Inventor: Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,935

(22) PCT Filed: Nov. 9, 2018

(86) PCT No.: PCT/JP2018/041688
§ 371 (c)(1),
(2) Date: Jun. 8, 2020

(87) PCT Pub. No.: WO2019/130854
PCT Pub. Date: Jul. 4, 2019

(65) Prior Publication Data
US 2021/0167600 A1    Jun. 3, 2021

(30) Foreign Application Priority Data
Dec. 25, 2017  (JP) .............................. JP2017-247416

(51) Int. Cl.
*H02J 3/14*  (2006.01)
*H02J 3/32*  (2006.01)
(Continued)

(52) U.S. Cl.
CPC ................ *H02J 3/144* (2020.01); *H02J 3/32* (2013.01); *H02J 3/322* (2020.01); *H02J 3/48* (2013.01);
(Continued)

(58) Field of Classification Search
CPC ................ H02J 3/144; H02J 13/00004; H02J 13/00001; H02J 3/32; H02J 2310/60;
(Continued)

(56) References Cited

U.S. PATENT DOCUMENTS

2011/0183733 A1* 7/2011 Yoshida .............. H04L 63/0823
463/1
2011/0185303 A1* 7/2011 Katagi ................... G06Q 10/06
715/771
(Continued)

FOREIGN PATENT DOCUMENTS

EP        3252904 A1    12/2017
JP    2004-180440 A     6/2004
(Continued)

OTHER PUBLICATIONS

International Search Report and Written Opinion of PCT Application No. PCT/JP2018/041688, dated Jan. 29, 2019, 10 pages of ISRWO.

*Primary Examiner* — Charles R Kasenge
(74) *Attorney, Agent, or Firm* — Chip Law Group

(57) ABSTRACT

There is provided a power supply arbitration device that makes it possible for side of a power consumer to take initiative to stabilize a power grid and suppress peak power for the power consumer. The power supply arbitration device including a control unit, a communication unit that communicates with another device through a communication network, and a storage unit that stores information, in which, in a case where a power request received by the communication unit is requested from a power consumption device registered in the storage unit, the control unit specifies a power supply device registered in the storage unit as a power feeding device that supplies power requested by the registered power consumption device on a basis of a power (Continued)

consumption profile associated with the registered power consumption device.

13 Claims, 14 Drawing Sheets

(51) Int. Cl.
*H02J 13/00* (2006.01)
*H02J 3/48* (2006.01)

(52) U.S. Cl.
CPC .. *H02J 13/00001* (2020.01); *H02J 13/00004* (2020.01)

(58) Field of Classification Search
CPC ......... H02J 3/322; H02J 3/48; Y02B 70/3225; Y04S 20/222; G06Q 50/06
See application file for complete search history.

(56) References Cited

U.S. PATENT DOCUMENTS

| | | | |
|---|---|---|---|
| 2011/0251807 A1* | 10/2011 | Rada | G01D 4/00 702/61 |
| 2015/0032278 A1* | 1/2015 | Bhageria | H02J 13/00006 700/295 |
| 2015/0081127 A1* | 3/2015 | Bhageria | H02J 4/00 700/295 |
| 2017/0023964 A1* | 1/2017 | Bhageria | H02J 3/14 |
| 2017/0310161 A1* | 10/2017 | Tokunaga | H02J 3/004 |
| 2018/0278083 A1 | 9/2018 | Andre et al. | |
| 2019/0235554 A1* | 8/2019 | Bhageria | H02J 3/38 |

FOREIGN PATENT DOCUMENTS

| | | |
|---|---|---|
| JP | 2010-193562 A | 9/2010 |
| JP | 2012-037339 A | 2/2012 |
| JP | 2013-106381 A | 5/2013 |
| WO | 2016/121270 A1 | 8/2016 |

* cited by examiner

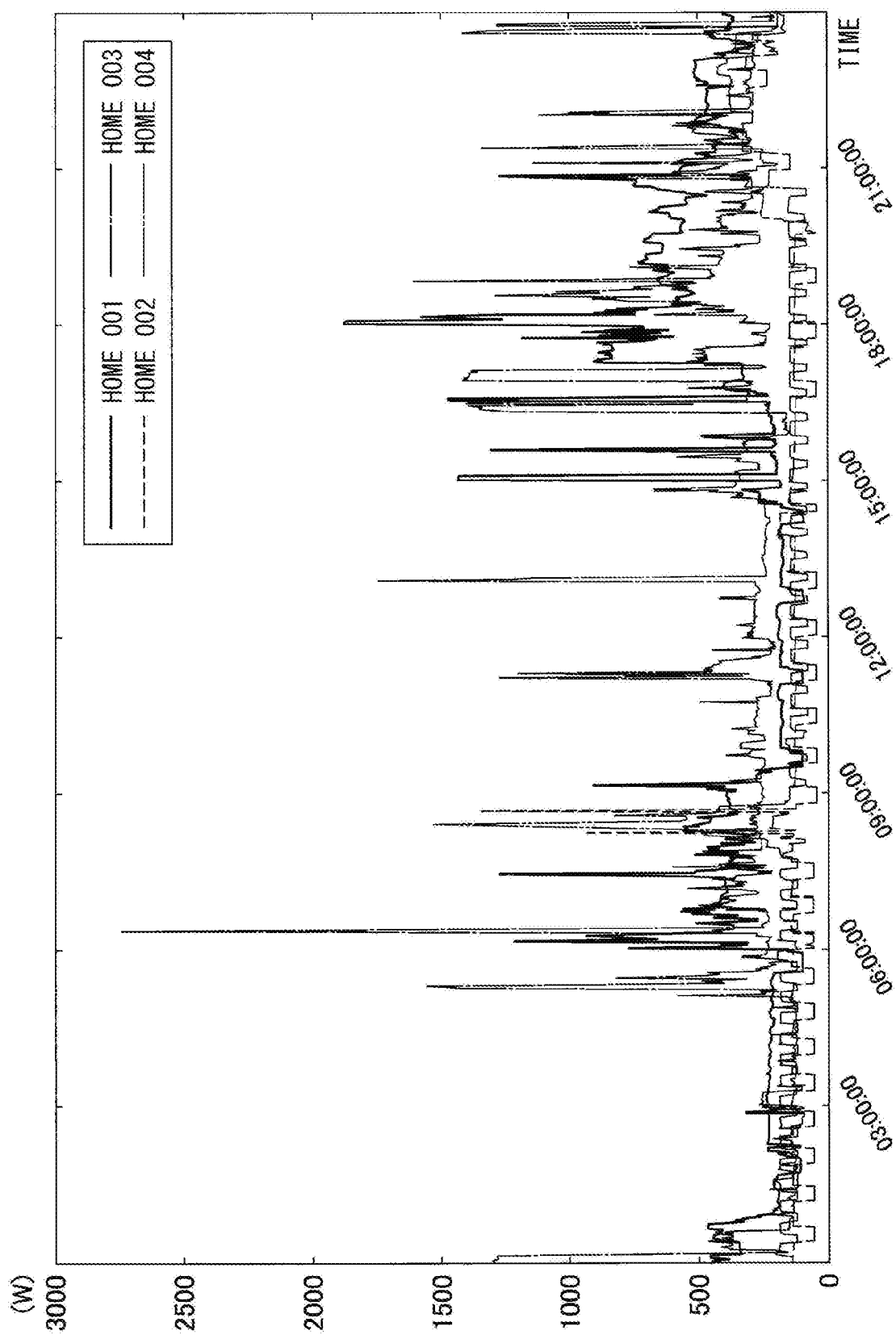

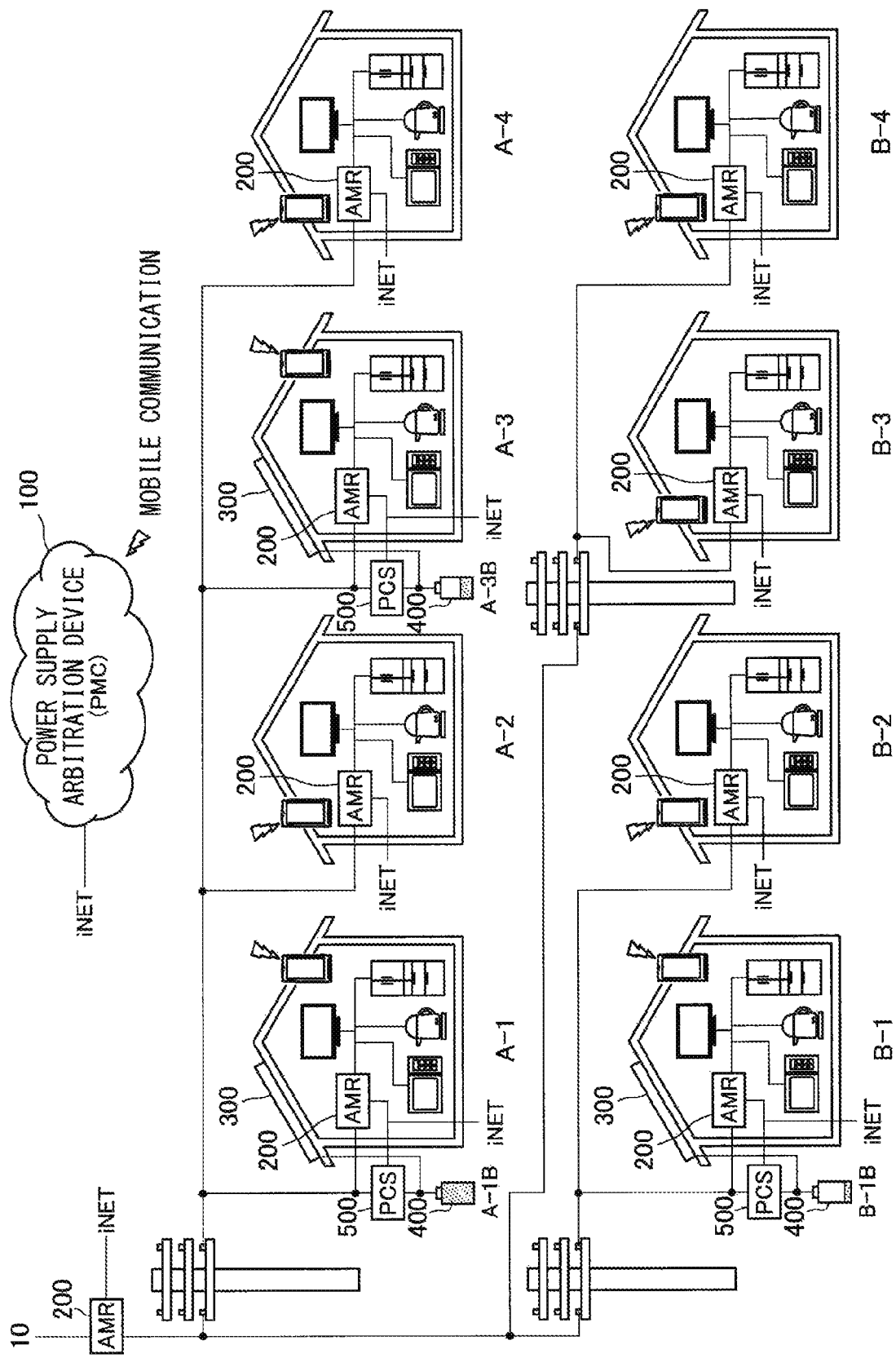
[FIG. 2]

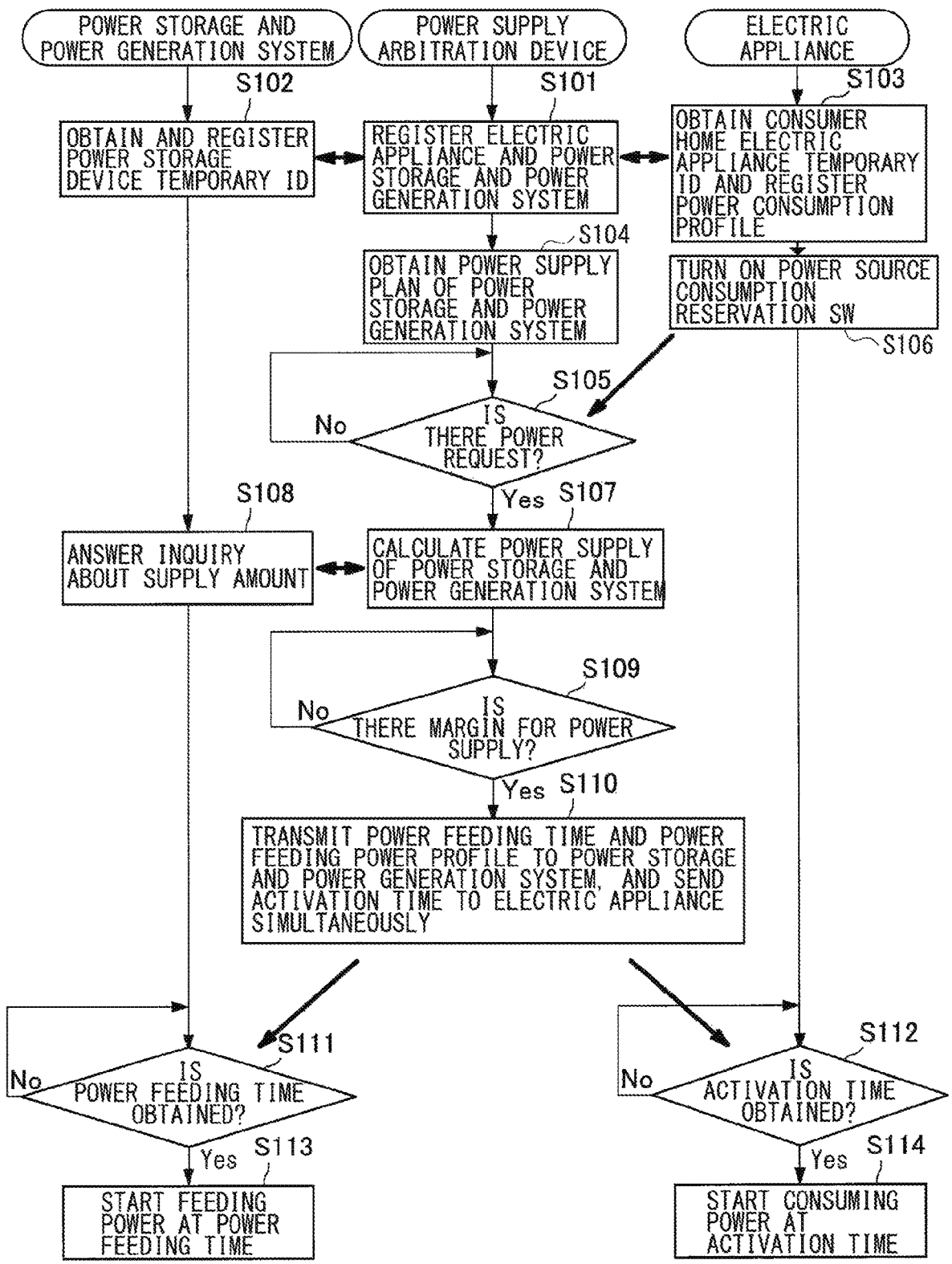

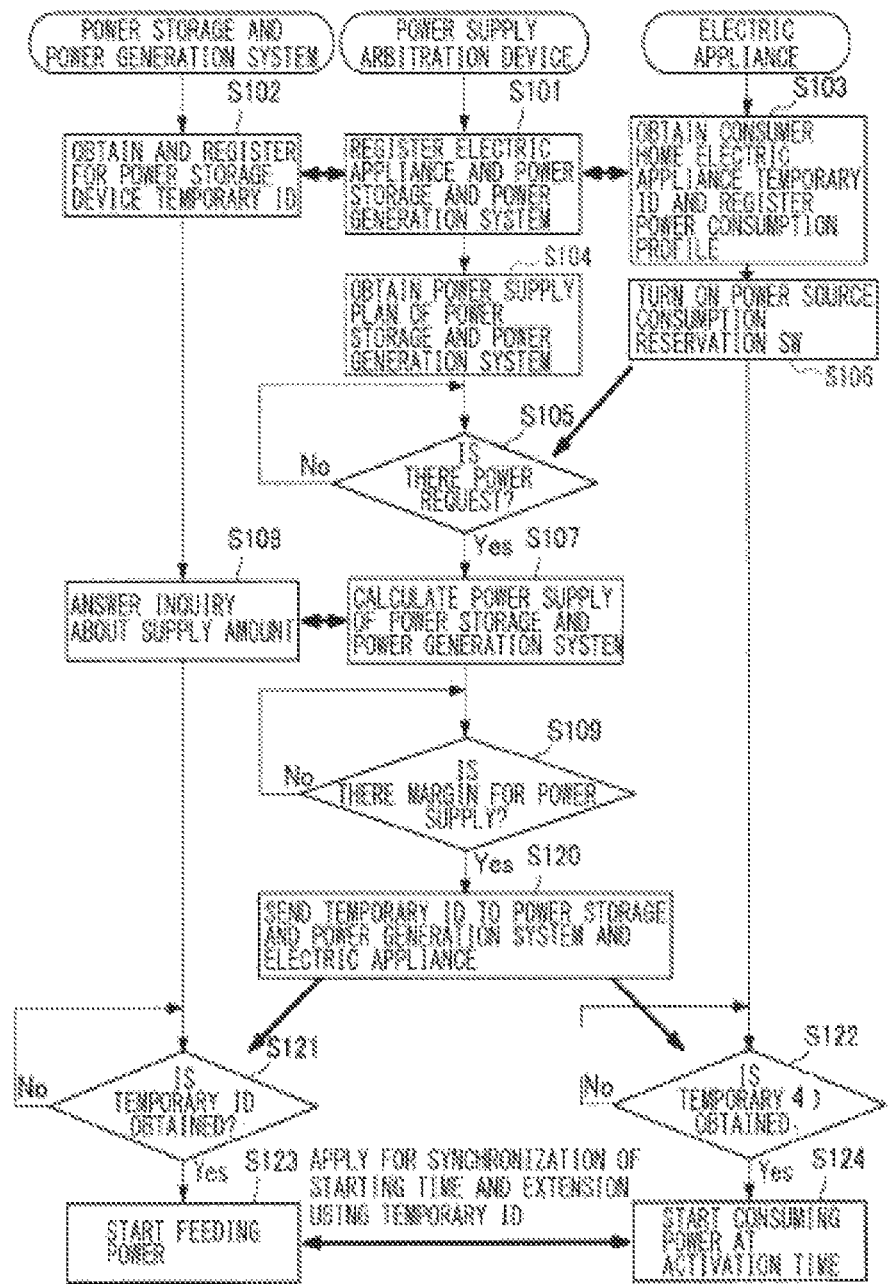

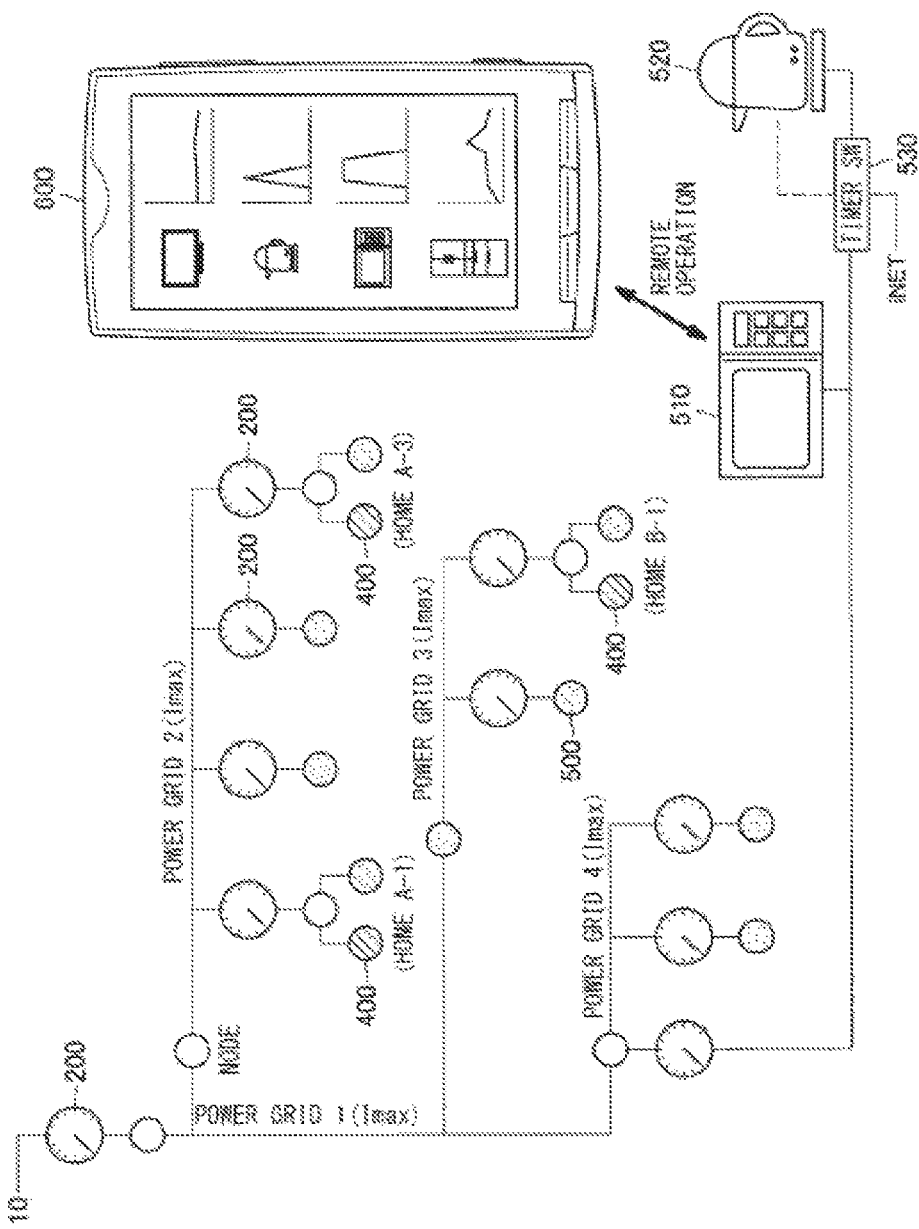

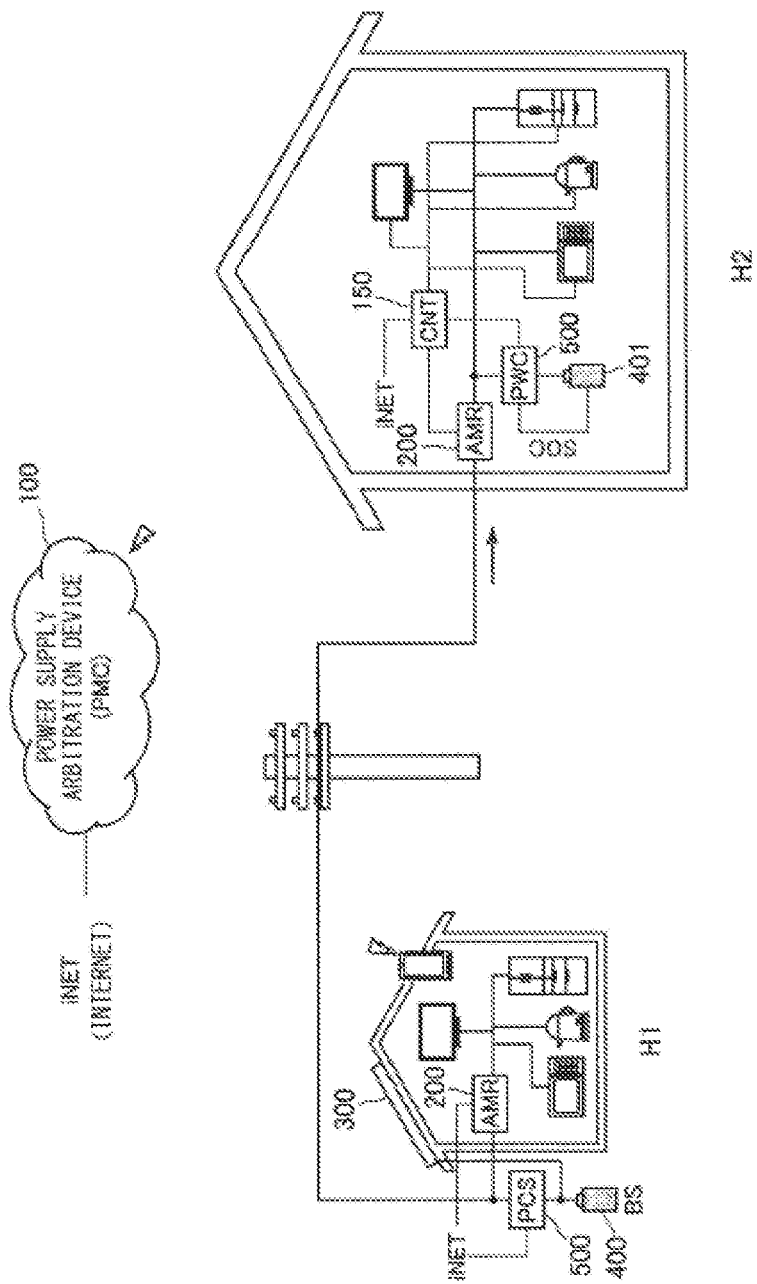

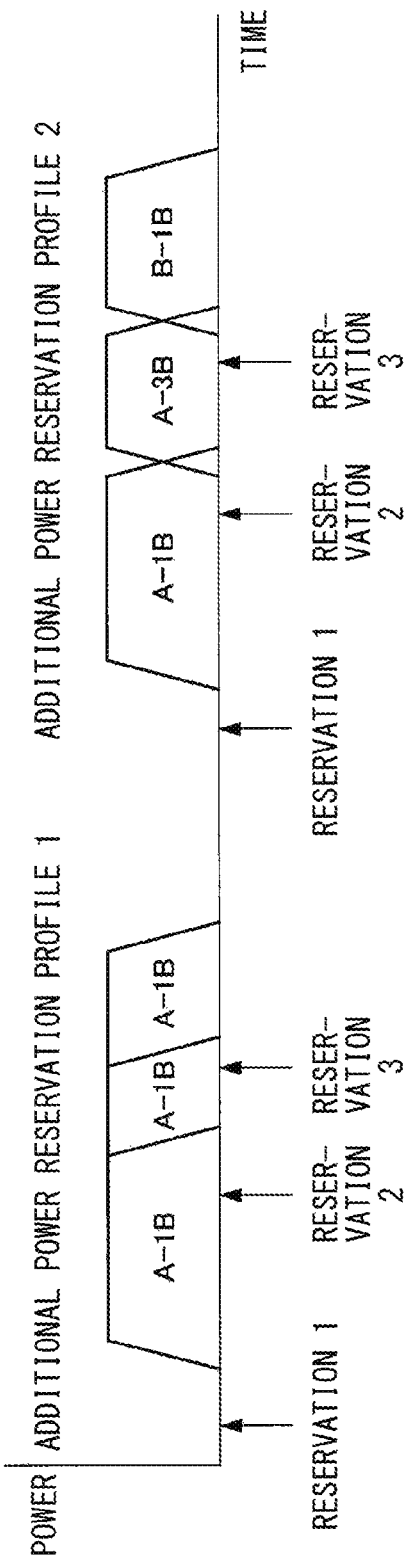
[FIG. 7]

[FIG. 8]
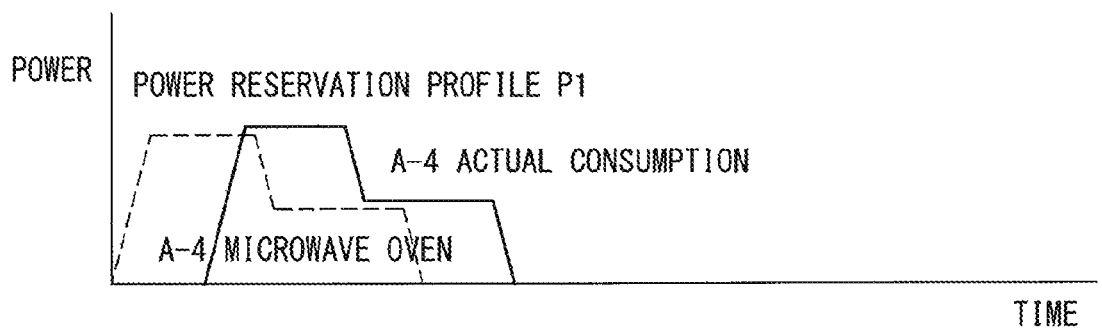
[FIG. 9]
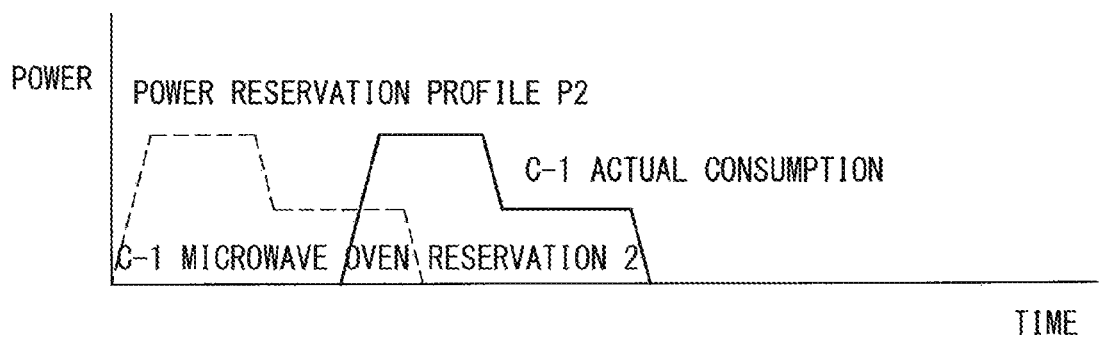
[FIG. 10]
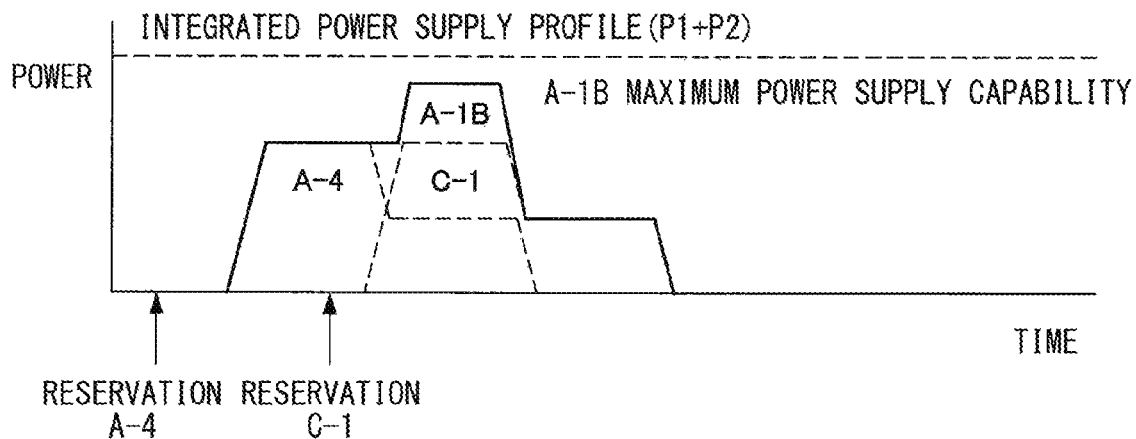

[FIG. 11]
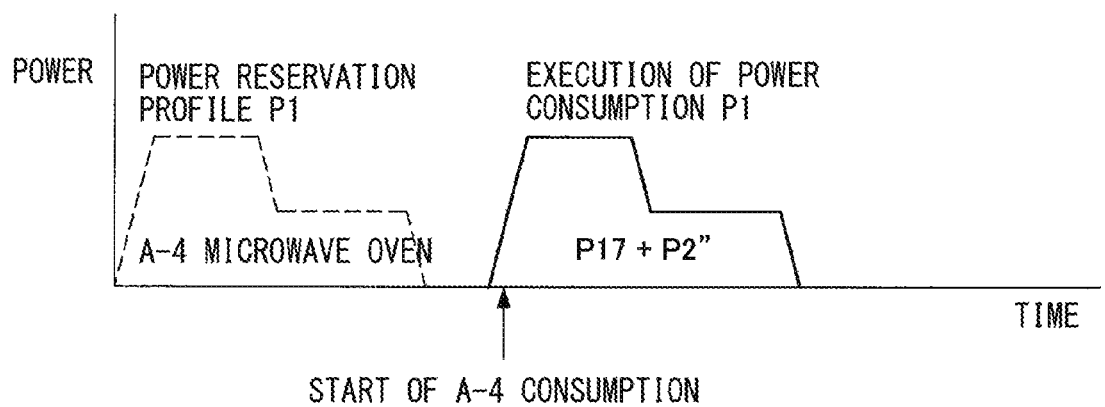
[FIG. 12]
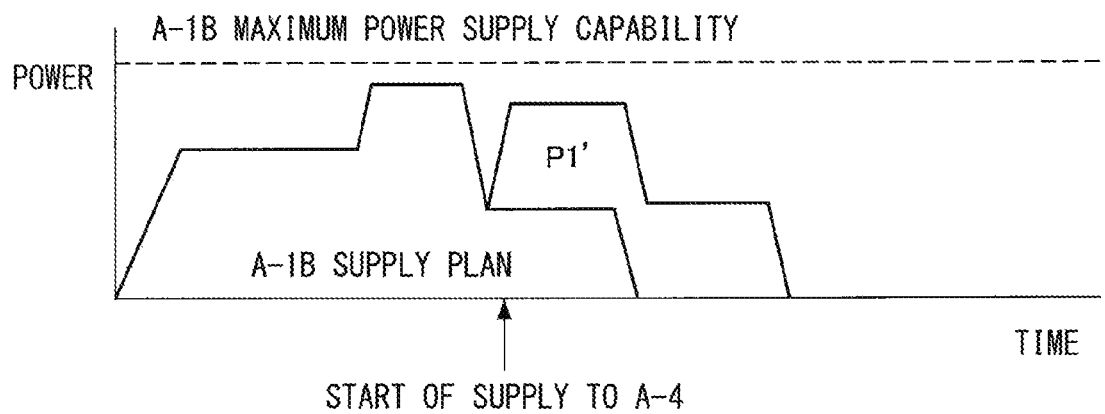
[FIG. 13]
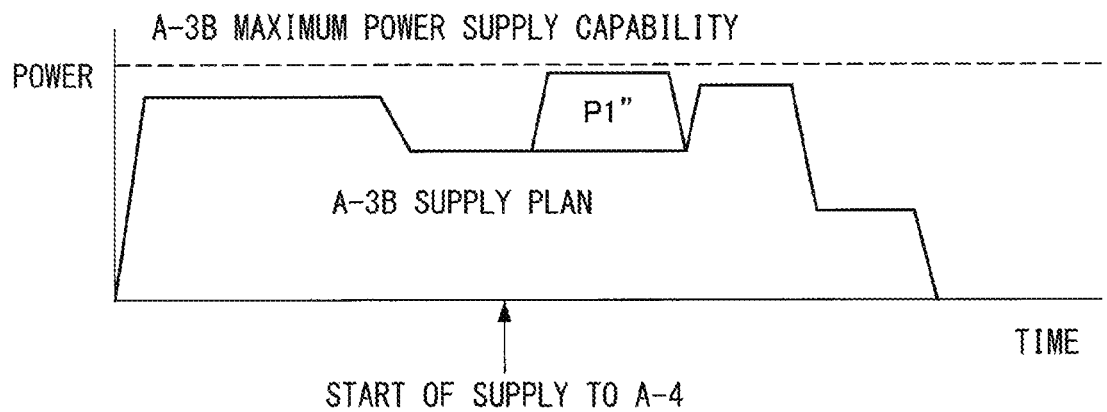

[FIG. 14]

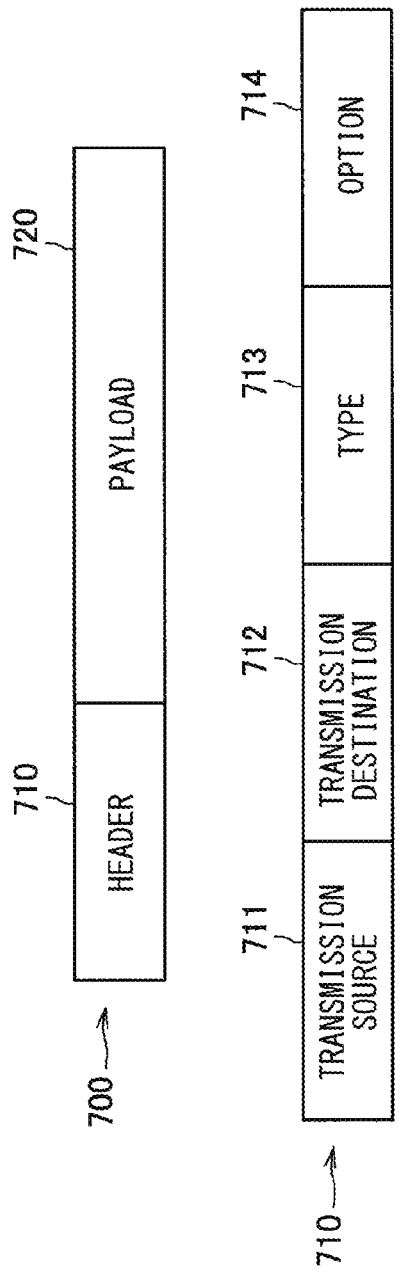

| TYPE | PAYLOAD DATA |
|---|---|
| 1: DEVICE REGISTRATION INFORMATION | DEVICE TYPE (1: POWER SUPPLY ARBITRATION DEVICE, 2: POWER SUPPLY DEVICE, 3: POWER CONSUMPTION DEVICE), DEVICE ID (IDENTIFIER) |
| 2: POWER PROFILE | DATA SIZE, DATA (POWER AMOUNT FOR EACH TIME) |
| 3: POWER REQUEST | POWER REQUEST DEVICE INFORMATION (DEVICE TYPE, DEVICE ID) |
| 4: POWER FEEDING INFORMATION | POWER FEEDING STARTING TIME, POWER FEEDING PROFILE (DATA SIZE, DATA (POWER AMOUNT FOR EACH TIME)) |
| 5: POWER RECEIVING/FEEDING IDENTIFICATION INFORMATION | TEMPORARY ID (ID OF DEVICE CONVERTED BY POWER ARBITRATION DEVICE OR RELAY ROUTER, FOR USE IN ARBITRATION OF POWER RECEIVING/FEEDING TIMING) |
| 6: ACTIVATION TIME INFORMATION | ACTIVATION TIME OF POWER CONSUMPTION DEVICE |

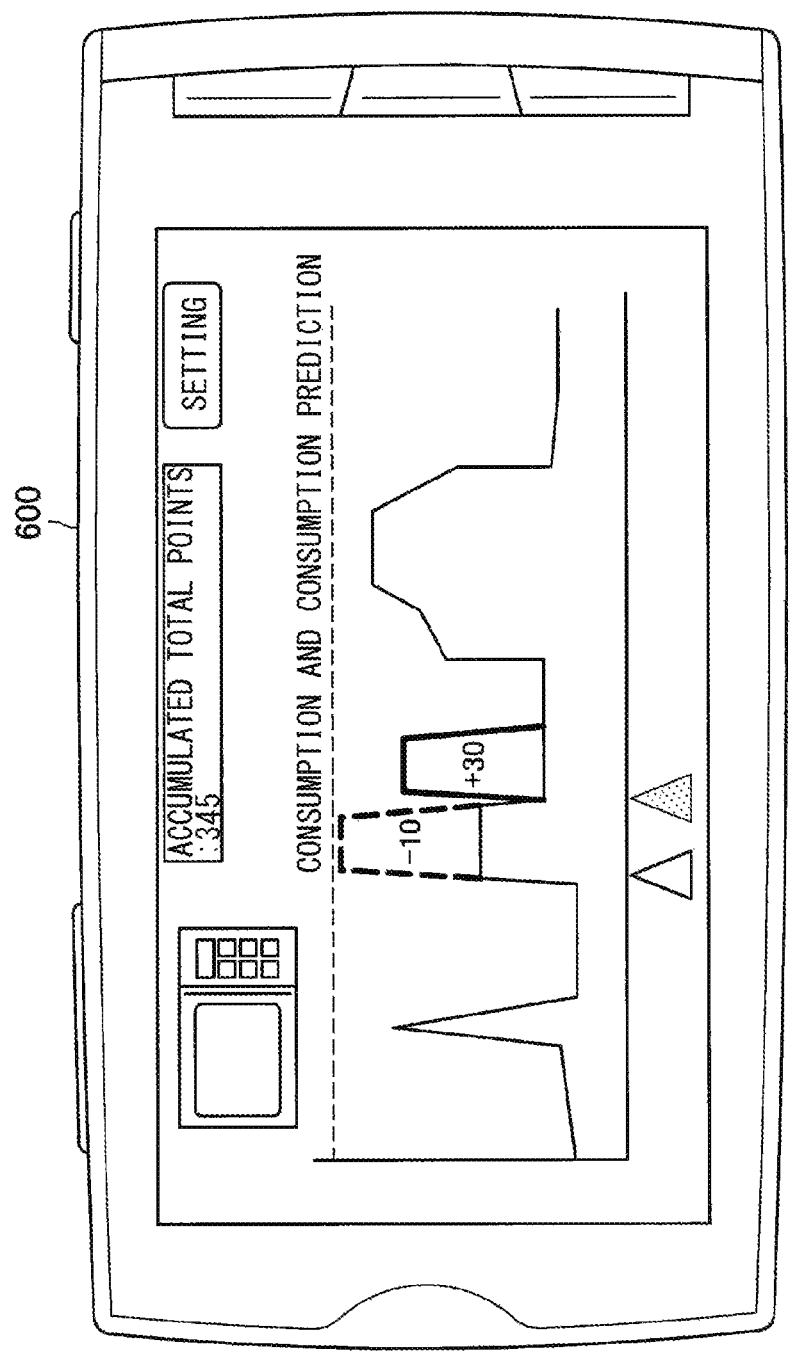
[FIG. 15]

[FIG. 16]
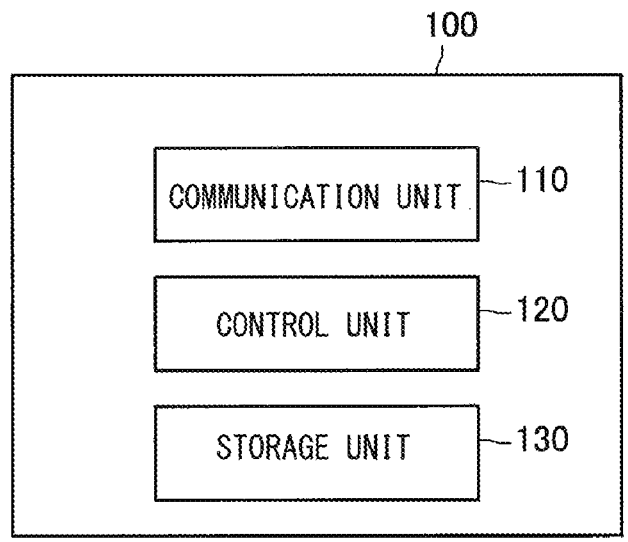
[FIG. 17]
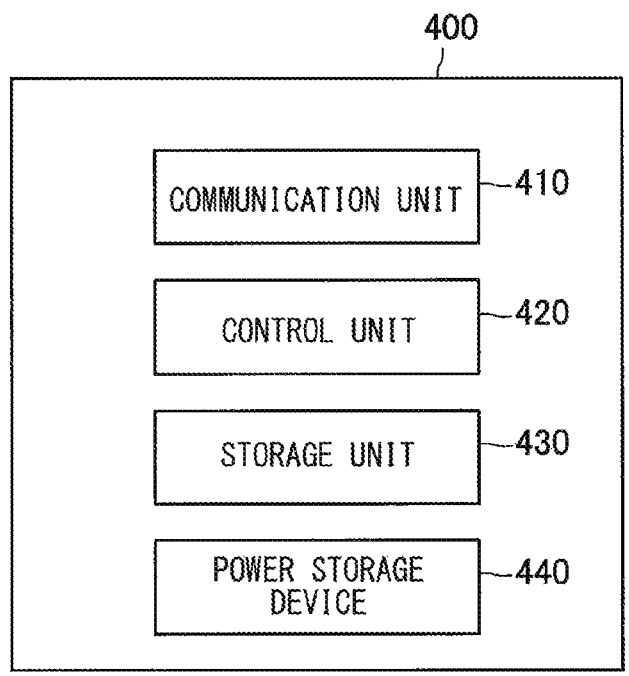

[FIG. 18]
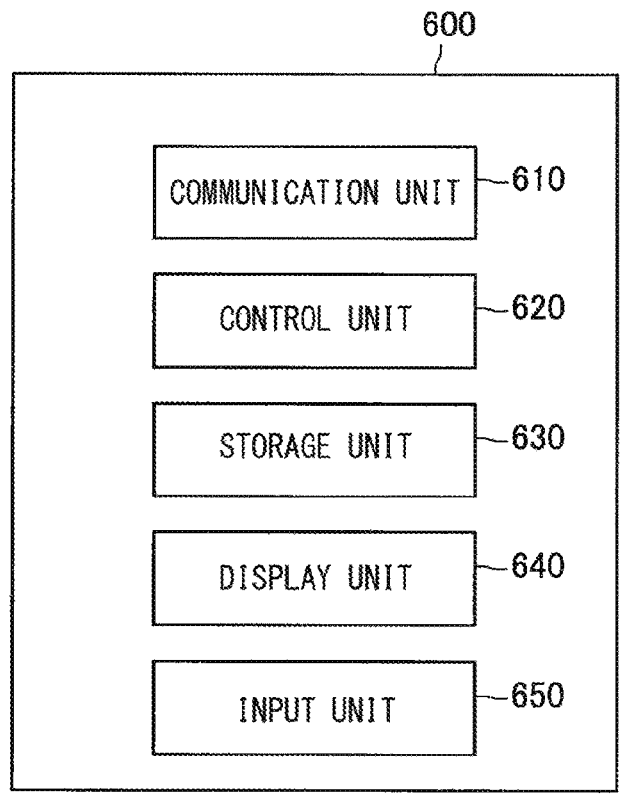
[FIG. 19]
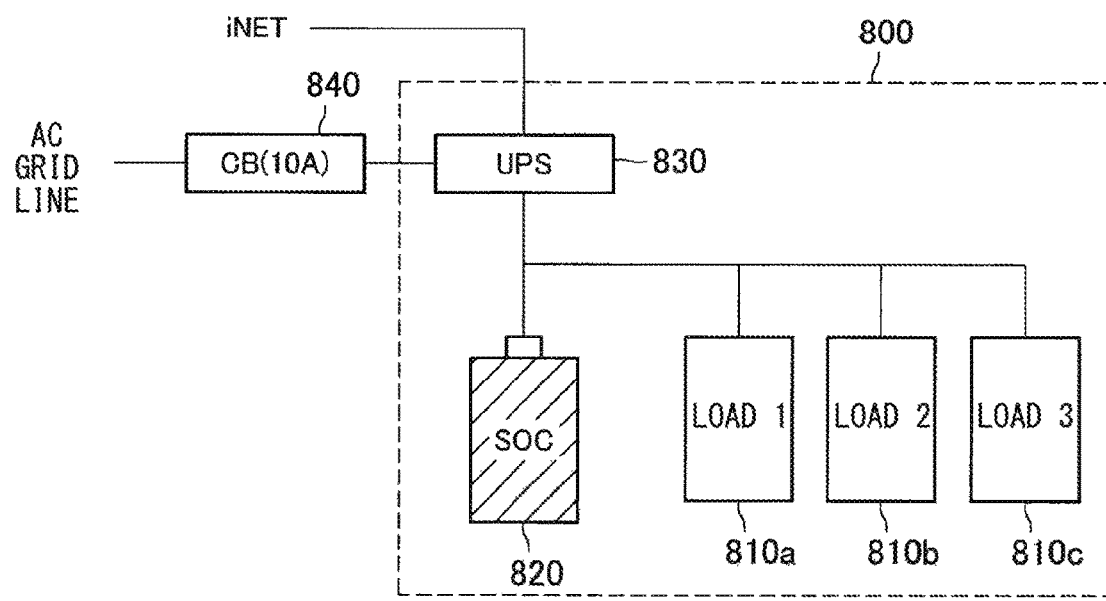

[FIG. 20]
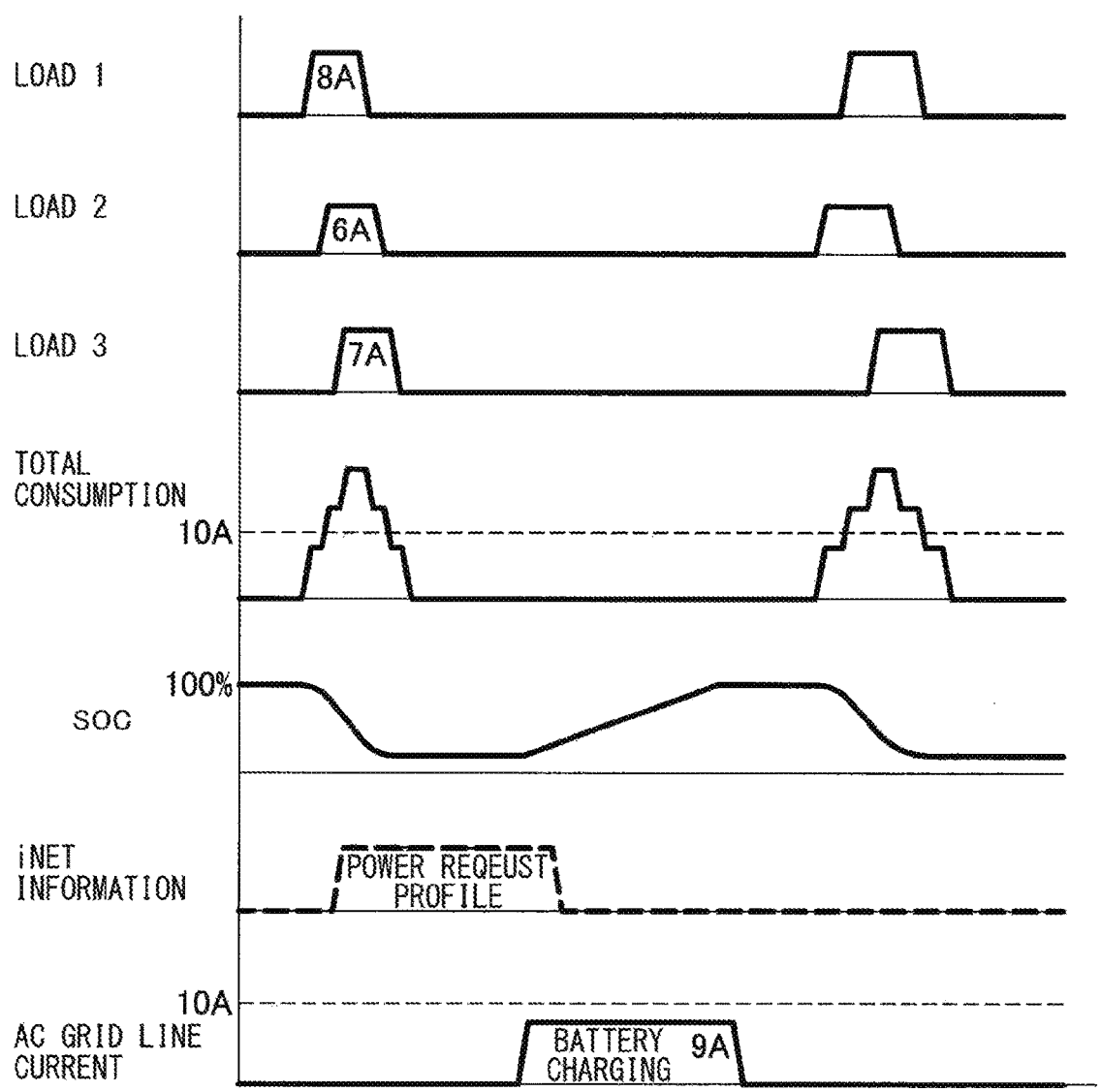

POWER SUPPLY ARBITRATION DEVICE, POWER SUPPLY DEVICE, POWER CONSUMPTION DEVICE, POWER SUPPLY REMOTE CONTROLLER, POWER SUPPLY ARBITRATION METHOD, AND POWER SYSTEM

CROSS REFERENCE TO RELATED APPLICATIONS

This application is a U.S. National Phase of International Patent Application No. PCT/JP2018/041688 filed on Nov. 9, 2018, which claims priority benefit of Japanese Patent Application No. JP 2017-247416 filed in the Japan Patent Office on Dec. 25, 2017. Each of the above-referenced applications is hereby incorporated herein by reference in its entirety.

TECHNICAL FIELD

The present disclosure relates to a power supply arbitration device, a power supply device, a power consumption device, a power supply remote controller, a power supply arbitration method, and a power system.

BACKGROUND ART

Techniques have been disclosed that limit power supply or prompt a consumer to save power as needed when there is a change in an amount of generation of power or an amount of power demand of the consumer who uses the power. For example, PTL 1 discloses a technique of sending the consumer a notification prompting to turn off a power source of an electronic device or to change various settings in order to adjust an amount of the power demand of the consumer when power shortage is expected due to a change in weather, or the like.

CITATION LIST

Patent Literature

PTL 1: Japanese Unexamined Patent Application Publication No. 2013-106381

SUMMARY OF THE INVENTION

Problem to be Solved by the Invention

However, existing techniques are aimed at stabilizing a power grid by imposing limitation of power consumption on consumers before the power demand surges; however, power consumption adjustment is not performed for individual electric appliances used by the consumers.

Therefore, the present disclosure proposes a power supply arbitration device, a power supply device, a power consumption device, a power supply remote controller, a power supply arbitration method, and a power system that are novel and improved, and that make it possible for side of a power consumer to take initiative to stabilize a power grid and suppress peak power for the power consumer.

Means for Solving the Problem

According to the present disclosure, there is provided a power supply arbitration device including: a control unit; a communication unit that communicates with another device through a communication network; and a storage unit that stores information, in which the control unit registers a power supply device in the storage unit on a basis of power supply device registration information received by the communication unit, the control unit registers a power consumption device in the storage unit on a basis of power consumption device registration information received by the communication unit, the control unit stores a power consumption profile of the power consumption device received by the communication unit in the storage unit in association with the power consumption device registered in the storage unit, and, in a case where a power request received by the communication unit is requested from the power consumption device registered in the storage unit, the control unit specifies the power supply device registered in the storage unit as a power feeding device that supplies power requested by the registered power consumption device on a basis of the power consumption profile associated with the registered power consumption device.

In addition, according to the present disclosure, there is provided a power supply device including: a control unit; a communication unit that communicates with another device through a communication network; and a storage unit that stores information, in which the control unit causes the communication unit to transmit information for registration of an own device to a power supply arbitration device, which arbitrates power supply, designated as a transmission destination, and, in a case where an inquiry about a power supply amount received by the communication unit is sent from the power supply arbitration device, the control unit causes the communication unit to transmit power supply amount information from the own device to the power supply arbitration device designated as the transmission destination.

In addition, according to the present disclosure, there is provided a power consumption device including: a control unit; a communication unit that communicates with another device through a communication network; and a storage unit that stores information, in which the control unit causes the communication unit to transmit information for registration of an own device and a power consumption profile at the own device to a power supply arbitration device, which arbitrates power supply, designated as a transmission destination, and the control unit causes the communication unit to transmit a power request to the power supply arbitration device designated as the transmission destination.

In addition, according to the present disclosure, there is provided a power supply remote controller including: a display unit; an input unit with which an instruction from a user is inputted; a control unit; a communication unit that communicates with another device through a communication network; and a storage unit that stores information, in which the control unit registers a power consumption device that consumes power in the storage unit on a basis of power consumption device registration information received by the communication unit, the control unit stores a power consumption profile of the power consumption device received by the communication unit in the storage unit in association with the power consumption device registered in the storage unit, the control unit causes the communication unit to transmit information for registration of the power consumption device and the power consumption profile to a power supply arbitration device, which arbitrates power supply, designated as a transmission destination, and, in a case where activation reservation for the power consumption device displayed on the display unit is selected by the input unit, the control unit causes the communication unit to transmit a power request for the power consumption device to the power supply arbitration device designated as the transmission destination.

In addition, according to the present disclosure, there is provided a power supply arbitration method including causing a processor to: register a power supply device on a basis of received power supply device registration information, register a power consumption device on a basis of received power consumption device registration information, store a received power consumption profile of the power consumption device in association with the registered power consumption device, and specify the power supply device registered as a power feeding device that supplies power requested by the registered power consumption device on a basis of the power consumption profile associated with the registered power consumption device in a case where a received power request is requested from the registered power consumption device.

In addition, according to the present disclosure, there is provided a power system including: a power supply arbitration device; a power supply device that supplies power; and a power consumption device that consumes power, in which the power supply arbitration device includes a control unit, a communication unit that communicates with another device through a communication network, and a storage unit that stores information, in which the control unit registers the power supply device in the storage unit on a basis of power supply device registration information received by the communication unit, the control unit registers the power consumption device in the storage unit on a basis of power consumption device registration information received by the communication unit, the control unit stores a power consumption profile of the power consumption device received by the communication unit in the storage unit in association with the power consumption device registered in the storage unit, and, in a case where a power request received by the communication unit is requested from the power consumption device registered in the storage unit, the control unit specifies the power supply device registered in the storage unit as a power feeding device that supplies power requested by the registered power consumption device on a basis of the power consumption profile associated with the registered power consumption device.

Effect of the Invention

As described above, according to the present disclosure, it is possible to provide a power supply arbitration device, a power supply device, a power consumption device, a power supply remote controller, a power supply arbitration method, and a power system that are novel and improved, and that make it possible for side of a power consumer to take initiative to stabilize a power grid and suppress peak power for the power consumer.

It is to be noted that the above-mentioned effects are not necessarily limitative; in addition to or in place of the above effects, there may be achieved any of the effects described in the present specification or other effects that may be grasped from the present specification.

BRIEF DESCRIPTION OF THE DRAWINGS

FIG. 1 is an explanatory diagram illustrating an example of changes in daily power consumption amounts of four homes.

FIG. 2 is an explanatory diagram illustrating a configuration example of a power system according to an embodiment of the present disclosure.

FIG. 3 is a flowchart illustrating an operation example of the power system according to an embodiment of the present disclosure.

FIG. 4 is a flowchart illustrating an operation example of the power system according to an embodiment of the present disclosure.

FIG. 5 is an explanatory diagram illustrating an arrangement example of the power system according to an embodiment of the present disclosure.

FIG. 6 is an explanatory diagram illustrating a configuration example of the power system according to an embodiment of the present disclosure.

FIG. 7 is an explanatory diagram illustrating examples of a generation pattern of a power reservation profile.

FIG. 8 is an explanatory diagram illustrating a setting example of the power reservation profile.

FIG. 9 is an explanatory diagram illustrating a setting example of the power reservation profile.

FIG. 10 is an explanatory diagram illustrating a setting example of the power reservation profile.

FIG. 11 is an explanatory diagram illustrating a setting example of the power reservation profile.

FIG. 12 is an explanatory diagram illustrating a setting example of the power reservation profile.

FIG. 13 is an explanatory diagram illustrating a setting example of the power reservation profile.

FIG. 14 is an explanatory diagram illustrating a format example of communication messages exchanged in the power system according to an embodiment of the present disclosure.

FIG. 15 is an explanatory diagram illustrating an example of information displayed by an application.

FIG. 16 is an explanatory diagram illustrating a functional configuration example of a power supply arbitration device 100 according to an embodiment of the present disclosure.

FIG. 17 is an explanatory diagram illustrating a functional configuration example of a battery device 400 according to an embodiment of the present disclosure.

FIG. 18 is an explanatory diagram illustrating a functional configuration example of a smartphone 600 according to an embodiment of the present disclosure.

FIG. 19 is an explanatory diagram illustrating a configuration example of the power system according to an embodiment of the present disclosure.

FIG. 20 is an explanatory diagram illustrating a setting example of power consumptions of loads and power request profiles.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

It is to be noted that description is given in the following order.
1. Embodiments of Present Disclosure
  1.1. Overview
  1.2. Configuration Example and Operation Example
2. Conclusion

1. EMBODIMENTS OF PRESENT DISCLOSURE

1.1. Overview

First, description is given of an overview of an embodiment of the present disclosure, before giving description in detail of the embodiment of the present disclosure.

In order to facilitate housework, electrification of products has been advancing. Simultaneous use of a microwave oven, an IH (Induction heating) oven, a washing machine with a drier, and a dish washer/dryer, which instantaneously need high power, causes peak power to exceed a home power distribution capacity, resulting in operation of a breaker to stop home electric appliances in operation.

In addition, simultaneous operation of a plurality of electric appliances increases power usage rapidly; such use of electric appliance may possibly result in tight capacity of a transmission line or an unstable generator, thus inducing a power failure.

FIG. 1 is an explanatory diagram illustrating an example of changes in daily power consumption amounts of four home. From 1:00 to 5:00, there is almost no power consumption in all four cases. At around 6:00, a home 003 consumes 2.7 kW instantaneously. These peaks are due to simultaneous use of a water heater and a microwave oven; unless they are used overlappingly, they do not exceed a maximum electric appliance consumption for a home (e.g., 1.5 kW). In addition, from around 14:00, the power consumption amount of each home starts to increase, and consumptions of a home 001 and the home 003 overlap each other in the example of FIG. 1. In a case where the two homes are nearby, power is supplied from the same utility pole, and thus a load is applied to a pole transformer of the pole. At this time, shifting use time of electric appliances, which consume a large amount of power, in one home enables reduction of a load on the pole transformer; however, it is currently difficult for consumers to perform such voluntary shift of the use time. In addition, from 18:00 to 21:00, a power demand increases, for example, due to consumption of air conditioners, and the like, thus resulting in tight capacity of a transmission line.

There is a system that aims at storing power generated by a solar power generator in a battery and feeding power by reverse power flow via a power conditioner. Such a system monitors a power grid voltage, and operates an inverter for the reverse power flow after a voltage drop. Accordingly, an operation delay in the inverter causes the power grid voltage to fluctuate, resulting in creation of an even more unstable situation.

Further, there is a technique (e.g., a demand response system) that limits power supply or prompts consumers to save power as necessary when there is a change in an amount of generation of power or an amount of power demand of the consumer who uses the power. Such a system is aimed at stabilizing the power grid by imposing limitation of power consumption on consumers before the power demand surges; however, power consumption adjustment is not performed for individual electric appliances used by the consumers.

Accordingly, in view of the above-described respects, the present discloser has intensively studied a technique that makes it possible for side of the power consumer to take initiative to stabilize the power grid and suppress peak power for the power consumer. As a result, as described below, the present discloser has devised a technique that makes it possible for the side of the power consumer to take initiative to stabilize the power grid and suppress peak power for the power consumer.

The description has been given above of the overview of an embodiment of the present disclosure. Subsequently, description is given in detail of an embodiment of the present disclosure.

1.2. Configuration Example and Operation Example

FIG. 2 is an explanatory diagram illustrating a configuration example of a power system according to an embodiment of the present disclosure. Hereinafter, description is given, with reference to FIG. 2, of a configuration example of the power system according to an embodiment of the present disclosure.

In the power system illustrated in FIG. 2, power generated at a power plant is supplied to each home through a grid power line 10. Although eight homes are illustrated in FIG. 2, such an example is not limitative. In addition to the power from the grid power line 10, a power supply system illustrated in FIG. 2 has a configuration, in which a solar cell 300 that generates power by solar light is provided on a roof of some of homes to charge a battery device 400 with natural energy from the solar cell 300, and a function is provided to perform reverse power flow to electric appliances in the homes from the battery device 400 through a power conditioner (PCS) 500 to assist a portion of an increase in the power consumption amount of the home. The electric appliances in the homes are examples of a power consumption device of the present disclosure.

A power supply arbitration device (PMC) 100 is coupled to a network (e.g., the Internet), and sends an instruction to the power conditioner 500 of a home provided with the battery device 400. In addition, the power supply arbitration device 100 also monitors a power storage amount and a suppliable amount of the battery device 400 in a vicinity of a home where electric appliances are located.

In accordance with a power consumption profile and activation time sent to the power conditioner 500 from the power supply arbitration device 100 through the network, the power conditioner 500 controls an amount of power flowing reversely from the battery device 400.

A power meter (AMR) 200 is a device that measures amounts of power flowing to each home through the grid power line 10 and power used by each home, and is coupled to the network (e.g., the Internet). Information on the power amount measured by the power meter 200 is sent to the power supply arbitration device 100 through the network.

The power system illustrated in FIG. 2 confirms whether power is suppliable from the battery device 400 near a wiring line path prior to switching on a power source of an electric appliance in each home. When the power is suppliable from the battery device 400, reverse power flow from the battery device 400 to the grid power line 10 and power consumption by an electric appliance are synchronized with each other in accordance with a power consumption profile provided for the electric appliance. Therefore, the battery device 400 may include a function of communicating with other devices or a processing function of performing a calculation, etc. of a predicted amount of power storage. Electric appliances to be controlled for power consumption is desirably configured to be remotely controllable for on and off of a power source, for example, from an information processor such as a smartphone or a tablet-type terminal. In addition, an application installed in the information processor is able to register an electric appliance to be controlled for power consumption. In addition, the power consumption profile of the registered electric appliance is registered in the information processor. The application communicates with the power supply arbitration device 100 installed on the network by communication. The power supply arbitration device 100 monitors the power storage amount and the suppliable amount of the battery device 400 in the vicinity of the home where electric appliances are located. Information on the power storage amount and the suppliable amount of the battery device 400 is sent to the above application and displayed on the above information processor.

In accordance with a power consumption request from the above application, the power supply arbitration device 100 chooses a battery device 400 that is close to its power consumption source and is able to supply power in accordance with the requested power consumption profile. The power supply arbitration device 100 sends, to the power conditioner 500 provided for the battery device 400, the power consumption profile and a starting time for supplying power, and sends start time to the application as well. The application remotely switches on an electric appliance at the starting time sent from the power supply arbitration device 100. By remotely activating the electric appliance from the above application in this manner, it becomes possible to synchronize a power feeding timing from the battery device 400, a power feeding power amount, and power consumption in the electric appliance with one another.

In a case where the electric appliance itself has a communication function, the electric appliance communicates directly with the power supply arbitration device 100. The electric appliance sends a request for power supply to the power supply arbitration device 100, and the power supply arbitration device 100 returns information on activation time to the electric appliance that has sent the request for power supply. The electric appliance activates to receive power supply at the activation time received from the power supply arbitration device 100.

In addition to a function itself as an electric appliance, the above electric appliance has an activation timer that operates in response to an instruction from the network, and an information displaying function. The information displaying function has a function of displaying time for the activation timer. When an activation request button is pressed, the above electric appliance transmits, to the power supply arbitration device 100, an activation request including identification information (ID information, MAC address, etc.) assigned to itself. Then, the electric appliance sets an activation timing returned from the power supply arbitration device 100 to operate the activation timer, and displays waiting time using the information displaying function.

When the activation request is transmitted from the above home electric appliance, the power supply arbitration device 100 reads the power consumption profile registered in advance, and confirms information on power feeding reservation of the registered battery device 400. When there is the battery device 400 having a margin for a remaining capacity, the power supply arbitration device 100 sends a power consumption profile to the battery device 400 to reserve power transmission from the battery device 400, and simultaneously sends activation timing information back to the above electric appliance that has sent the activation request.

When the activation request is sent from the above electric appliance and arbitration is made with a battery device 400 having a margin for the power, the power supply arbitration device 100 generates temporary IDs, which are transitory, for the battery device 400 and the above electric appliance. It is assumed that the respective IDs are set as a power storage device temporary ID and a consumer home electric appliance temporary ID. A pair of the generated power storage device temporary ID and consumer home electric appliance temporary ID is sent to the battery device 400 and the above electric appliance.

The above electric appliance scheduled to consume power communicates with the battery device 400 using the temporary ID generated by the power supply arbitration device 100, and adjusts a timing for the activation time. This enables the battery device 400 and the above electric appliance to be synchronized with each other without the power supply arbitration device 100, thus making it possible to alleviate synchronization disturbance due to a delay in communication or the like, and thus making it unnecessary to set a timer for the above electric appliance. In addition, the temporary ID generated by the power supply arbitration device 100 is valid only for the power arbitration, thus making it possible to apply restriction to prevent the above electric appliance from freely issuing the next request.

FIG. 3 is a flowchart illustrating an operation example of the power system according to an embodiment of the present disclosure. FIG. 3 illustrates an operation example of a case where the power supply arbitration device 100 intermediates optimal battery selection, power supply confirmation, activation time calculation, and arbitration until timer information generation to match timings for power supply and reception. In addition, it is assumed that the electric appliance of FIG. 3 has a network communication function, and is able to communicates with the power supply arbitration device 100 through the network.

The power supply arbitration device 100 registers information on the electric appliance or a power storage and power generation system (which refers to a system including the solar cell 300 and the battery device 400) (step S101). When the information on the electric appliance or the power storage and power generation system is registered, the power supply arbitration device 100 transmits information on the power storage device temporary ID to the power storage and power generation system, and sends the consumer home electric appliance temporary ID and the power consumption profile to the electric appliance. The power storage and power generation system obtains and registers information on the power storage device temporary ID from the power supply arbitration device 100 (step S102). In addition, the electric appliance obtains and registers the consumer home electric appliance temporary ID and the power consumption profile from the power supply arbitration device 100 (step S103).

Subsequently, the power supply arbitration device 100 obtains, from the power storage and power generation system, a power supply plan of the power storage and power generation system (step S104).

Subsequently, the power supply arbitration device 100 waits until there is a power request from the electric appliance (step S105). When a power source consumption reservation switch is turned on to turn on a power source at a predetermined time by an operation of a user (step S106), the electric appliance reserves power source consumption, and transmits a power request to the power supply arbitration device 100.

When receiving a power request from the electric appliance through the network, the power supply arbitration device 100 specifies the electric appliance on the basis of information on the registered power storage and power generation system, and calculates power supply of the power storage and power generation system (step S107). At this time, the power storage and power generation system registered by the power supply arbitration device 100 answers an inquiry about a power supply amount from the power supply arbitration device 100 (step S108).

The power supply arbitration device 100 sums up the power supply amounts acquired from the power storage and power generation system, and waits until there is a margin for power supply from the power storage and power generation system (step S109). When there is a margin for the power supply from the power storage and power generation system, the power supply arbitration device 100 transmits power feeding time and a power feeding power profile to the power storage and power generation system, and simultaneously sends activation time to the electric appliance (step S110).

The power storage and power generation system waits until power feeding time is obtained from the power supply arbitration device 100 (step S111), and the electric appliance waits until the activation time is obtained from the power supply arbitration device 100 (step S112). When obtaining the power feeding time from the power supply arbitration device 100, the power storage and power generation system starts feeding power from the battery device 400 at the power feeding time (step S113). Accordingly, the battery device 400 may include a timer function. In addition, when obtaining the activation time from the power supply arbitration device 100, the electric appliance starts consuming power at the activation time (step S114).

In the above-described example, the electric appliance transmits a power request to the power supply arbitration device 100 when the power source consumption reservation switch is turned on, but the present disclosure is not limited to such an example. For example, the electric appliance may transmit the power request to the power supply arbitration device 100 at a timing when the power consumption profile is updated.

FIG. 4 is a flowchart illustrating an operation example of the power system according to an embodiment of the present disclosure. FIG. 4 illustrates an operation example of a case where the power supply arbitration device 100 performs optimal battery selection, power supply confirmation, and generation of a temporary ID, and uses the temporary ID to cause the power storage and power generation system and the electric appliance to feed and receive power to and from each other. In addition, it is assumed that the electric appliance of FIG. 4 has a network communication function, and is able to communicate with the power supply arbitration device 100 through the network.

In the flowchart illustrated in FIG. 4, a series of processing up to step S109 is the same as that in FIG. 3, and therefore detailed description thereof is omitted. When there is a margin for power supply from the power storage and power generation system, the power supply arbitration device 100 sends the respective temporary IDs (the power storage device temporary ID and the consumer home electric appliance temporary ID) to the power storage and power generation system and the electric appliance (step S120).

The power storage and power generation system waits until the temporary ID is obtained from the power supply arbitration device 100 (step S121), and the electric appliance waits until the temporary ID is obtained from the power supply arbitration device 100 (step S122). When obtaining a temporary ID from the power supply arbitration device 100, the power storage and power generation system starts feeding power from the battery device 400 to the electric appliance having a target temporary ID (step S123). In addition, when obtaining the temporary ID from the power supply arbitration device 100, the electric appliance starts consuming power using power fed from the target power storage and power generation system (step S124).

In a case where the power supply arbitration device 100 generates the temporary ID in this manner, it is possible to provide flexibility such as extending power feeding time between the electric appliance and the battery device 400 even when an initially scheduled power consumption profile is changed. In addition, the temporary ID generated by the power supply arbitration device 100 may be converted to a real ID by the power supply arbitration device 100 or a relay router, and the real ID may disappear when the power supply from the battery device 400 terminates. This makes it possible to protect privacy of an owner of the power storage and power generation system or the electric appliance.

FIG. 5 is an explanatory diagram illustrating an arrangement example of the power system according to an embodiment of the present disclosure, and, in particular, an explanatory diagram illustrating an arrangement example of batteries and electric appliances registered in the power system, nodes to which cables are collectively coupled, and monitorable power meters. In the arrangement example illustrated in FIG. 5, an optimal pair is selected from a current capacity of each power grid, the power consumption profile of the electric appliance, and a supply capability of the battery device 400, and the power supply from the battery device 400 is reserved. FIG. 5 illustrates a microwave oven 510 and an electric kettle 520 as examples of the electric appliance.

For example, the microwave oven 510 that is a remotely controllable highly functional electric appliance is able to collaborate with the battery device 400 using timer reservation in cooperation with a smartphone 600, etc. illustrated in FIG. 5. Meanwhile, in the case of a remotely uncontrollable low functional electric appliance such as the electric kettle 520 including a heater, for example, a method is adopted that collaborates with the battery device 400 in cooperation with a timer switch box 530 having a function of communication with the network. When the electric kettle 520 is switched on, the timer switch box 530 detects that a resistance value on side of the electric kettle 520 has been lowered, and notifies the power supply arbitration device 100. The timer switch box 530 may have a temperature sensor therein, and may have a function of predicting time when a temperature of the heater of the electric kettle 520 is equal to or lower than a predetermined temperature to arbitrate the power supply to the power supply arbitration device 100.

The smartphone 600 may have a function of transmitting information for registering information on the electric appliance to the power supply arbitration device 100. In addition, the smartphone 600 may have a function of displaying the power consumption profile of the electric appliance. The power consumption profile illustrates a power consumption amount of the electric appliance in a time axis. The power consumption amount of the electric appliance may include past achievements, or may include a power consumption amount based on a future power consumption prediction. FIG. 5 illustrates an example of power consumption profiles of electric appliances. FIG. 5 illustrates an example of power consumption profiles of a television, an electric kettle, a microwave oven, and a refrigerator. The television has less change in the power consumption. Accordingly, the television may be set to receive power from the power grid. The electric kettle has a drastic change in the power consumption amount, and power to be used is able to be predicted by an amount of hot water therein. Accordingly, the electric kettle may be set to receive power from the battery device 400 located nearby. The microwave oven has a drastic change in the power consumption, and power to be used is able to be predicted by an amount of foods to be heated. Accordingly, the microwave oven may be set to receive power from the battery device 400 located nearby. The refrigerator has less change in the power consumption. Accordingly, the refrigerator may be set to receive power from the power grid. Further, the smartphone 600 may receive the above-described consumer home electric appliance temporary ID from the power supply arbitration device 100 to execute processing of specifying an electric appliance that receives power.

FIG. 6 is an explanatory diagram illustrating a configuration example of the power system according to an embodiment of the present disclosure. The battery device 400 holds a certain amount or more of power storage amounts via the power conditioner 500. A power consumption amount of a home is monitored in a unit of second by the power meter 200, and is notified to a control unit (CNT) 150. In a home H-2 illustrated in FIG. 6, a backup battery 401 is installed in the home.

When the electric appliance is switched on, the control unit 150 acquires the power consumption profile from the electric appliance, and calculates a total current value of the power consumption profile and another electric appliance currently operated and consuming power. In a case where the electric appliance consumes a first power amount specified within a contracted power, the control unit 150 performs a control to allow power exceeding the first power amount to be supplied from the power conditioner 500 in synchronization with activation of the electric appliance.

Meanwhile, in a case where an integrated power consumption of electric appliances in the home is equal to or less than a second power amount that is less than the first power amount described above, the control unit 150 controls the power conditioner 500, and controls charging to the battery device 400 to have a certain level of an SOC (State of Charge) or more. Power reception reservation to the battery device 400 is performed by communicating with the power conditioner 500 via the network (e.g., the Internet).

A capacity of the battery device 400 owned by the home according to this function may be a capacity to such an extent as to suppress a peak of an electric appliance that consumes the maximum power in a short period of time. In addition, a capability of the power conditioner 500 to convert the power of the battery device 400 from a direct current to an alternating current can be set to match a single electric appliance that uses large power instantaneously, instead of power consumptions of all electric appliances owned by the home. Thus, it is possible for the power system according to the present embodiment to reduce a size of the power conditioner 500 as well as to keep the cost low.

FIG. 7 is an explanatory diagram illustrating examples of a generation pattern of the power reservation profile at the time of additional power reservation in the power system according to an embodiment of the present disclosure. FIG. 7 illustrates an example of a case where the power consumption by the electric appliance is changed with respect to the initial reservation.

For example, in a case where the control unit 150 of a home A-4 reserves the power of the battery device 400 of a home A-1 and continues to make reservation thereafter, when additional time can be reserved in advance to the battery device 400 of the home A-1, continuous reservation is possible. Meanwhile, in a case where the battery device 400 of the home A-1 no longer has a margin for power supply, reservation is made for another battery device 400.

In this case, the control unit 150 in the home A-4 generates and asks the power reservation profile to supplement a power supply ending pattern of the battery device 400 of the home A-1. In a case of initially reserving power consumption for a long period of time, with a single battery device 400 unable to supply the power, the control unit 150 is also able to make reservations across a plurality of battery devices 400. An additional power reservation profile 2 in FIG. 7 illustrates an example of reservations across three battery devices 400 (home A-1, home A-3, and home B-1).

In a case where the power supply arbitration device 100 receives a power request from the electric appliance that consumes power in such a state where there are a margin in the power supply capability of the battery and a margin also in the power grid, when no efficient battery with a margin exists, a battery that has already been supplying power may also set an additional power reservation profile to control the power supply from the battery that has been supplying power.

FIGS. 8 to 10 are each an explanatory diagram illustrating a setting example of the power reservation profile. FIG. 8 illustrates an example of a power reservation profile in a case where a microwave oven installed in the home A-4 reserves power supply to the battery device 400 of the home A-1. FIG. 9 illustrates an example of a power reservation profile in a case where a microwave oven of a home C-1 also reserves power supply to the same battery device 400 of the home A-1.

Such power reservations are made not only between each of the electric appliances of the homes and the battery device 400 of the home A-1, but also with respect to the battery device 400 of the home B-1 in FIG. 2 as well as with respect to the backup battery 401 located in the home H-2 in FIG. 6.

Addition of an actual consumption part of FIG. 8 and an actual consumption part of FIG. 9 corresponds to a solid line part in a power reservation profile illustrated in FIG. 10. Here, the maximum suppliable power of the battery device 400 of the home A-1 is less than a total peak value of power usage of the microwave oven installed in the home A-4 and power usage of the microwave oven installed in the home C-1.

In a case where there is no battery device 400 having a sufficient margin to meet a power reservation profile requested by the electric appliance that consumes power, but power supply is possible by a combination of a plurality of battery devices 400, the battery device 400 may divide the power reservation profile requested by the electric appliance into two or more to assign the divided power reservation profiles to the respective battery devices 400.

FIGS. 11 to 13 are each an explanatory diagram illustrating a setting example of the power reservation profile. FIGS. 11 to 13 illustrate examples in which, in a case where reservation of power consumption made by the home A-4 causes the power supply arbitration device 100 to calculate the reserved power, but a single battery device 400 (e.g., the battery device 400 of the home A-1) is not able to supply the power, the power reservation profile is divided and calculated to allow for reserved power feeding to enable allocation to another battery device 400 (e.g., the battery device 400 of the home A-3).

In the power grid illustrated in FIG. 5, in a case where reservations are made that exceed the current capacity of the power grid in view of the reservation status, the power supply arbitration device 100 generates a power transfer profile between the battery devices 400 in advance, and moves power between the battery devices 400 on the basis of the power transfer profile. This enables the power supply arbitration device 100 to have functions of switching destinations of reservation of the battery device 400 made by the electric appliance and also making adjustment for the reservation not to exceed the capacity of the power grid. The power supply arbitration device 100 has information on the power grid. The information on the power grid includes information regarding coupling of the grids and information on a capacitance, i.e., the maximal current of each grid. As examples, FIG. 5 illustrates, as Imax, the maximal current of each of the power grids. On the basis of the above information on the power grid, the power supply arbitration device 100 switches destinations of the reservation of the battery device 400 made by the electric appliance to make adjustment for the reservation not to exceed the capacity of the power grid.

For example, in a case where it is known that a power grid 2 illustrated in FIG. 5 exceeds the capacity of the grid due to a reserved power feeding plan from the electric appliance and that a circumstance occurs in a few hours where a further power request is not accepted, the power supply arbitration device 100 generates a power transfer profile in advance to transmit power from the battery device 400 of the home A-1 to the battery device 400 of the home B-1, thus requesting the battery device 400 of the home A-1 to transmit power and charging the battery device 400 of the home B-1. By moving power from the battery device 400 of the home A-1 to the battery device 400 of the home B-1 in this manner, it is possible to supply power to the microwave oven 510 using power grids 3 and 4 without using the power grid 2.

FIG. 14 is a format example of a communication message exchanged in the power system according to an embodiment of the present disclosure. A communication message 700 includes a header part 710 and a payload part 720. The header part 710 includes transmission source information 711, transmission destination information 712, type information 713, and option information 714.

In the present embodiment, six pieces of information illustrated in FIG. 14 are stored as type information 713. Data stored in the payload part 720 differs for the respective types.

The description has been given heretofore, as an operation example of the power system according to an embodiment of the present disclosure, of the example in which, the power supply arbitration device 100 receives the power request from the electric appliance installed in the home and adjusts the power supply from the battery device 400. Subsequently, description is given, as an operation example of the power system according to an embodiment of the present disclosure, an example in which a power consumption amount of each home is monitored, and each home is prompted to cooperate to allow a total power consumption amount not to reach a certain value.

The power meter 200 in the power system illustrated in FIG. 1 monitors an amount of power usage periodically, for example, in a unit of seconds. The power meter 200 transmits a monitored power amount to a server device. The server device may be the power supply arbitration device 100 illustrated in FIG. 1, or may be another server device different from the power supply arbitration device 100.

The server device predicts consumption patterns of the respective homes on the basis of data collected from the respective power meters 200. Then, the server device calculates a value of the prediction and prediction of loads of respective pole transformers according to a power distribution diagram, and distributes a power consumption point value at that time to an information processor having a communication function, such as a smartphone owned by a resident of each home.

A home registered in the power system according to an embodiment of the present disclosure is able to confirm, using the above information processor, a consumption pattern of an own house, an own consumption prediction, and a consumption prediction of neighborhoods, which are summed up by the server device on the network.

The prediction of power consumption may be carried out by using, for example, a cumulative total of measured values up to the previous day for each time zone, each day of the week (or each measured value of weekdays and weekends), an average value of the cumulative total, data of the previous day, and the like.

The server device monitors sequential current values from the power meter 200 installed in the home and the power meter 200 installed in the power grid. The server device calculates current values of a power feeding line in each home and a transmission line coupled to the pole transformer, from the monitored current values and transmission path information of the server device itself. Then, the server device calculates a degree of margin for an allowable current value of the transmission line from the current values of the power feeding line and the transmission line, and makes conversion to representation centered on power feeding points of the home registered in the system. The server device distributes, to the above information processor, information (power feeding margin information) converted to the representation centered on the power feeding points of the home.

An application installed in the information processor displays the power feeding margin information sent from the server device and the electric appliance registered in advance, and, when the displayed electric appliance is selected, the power consumption profile of the electric appliance is displayed. The above-described application has a mechanism of displaying how many points can be obtained when a power source is turned on from a time point of the display onwards. On the basis of the point information, the user reserves time to turn on the power source of the electric appliance from the information processor. Then, when the electric appliance is actually turned on at the reserved time, points can be obtained. Meanwhile, in a case where time for consumption deviates significantly from the reserved time to result in a tight situation where there is no margin for power, the points are subtracted.

FIG. 15 is an explanatory diagram illustrating an example of information displayed by an application installed in the above information processor. The above application displays a power consumption status of the power grid on that day and prediction of future power consumption. Then, the application displays a reserved consumption profile of the selected electric appliance and points that can be obtained (or subtracted) at that time when power is turned on. The example in FIG. 15 illustrates 30 points being added when the power is turned on at a time point when there is a margin in power, whereas 10 points being subtracted when the power is turned on at a time point when there is no margin in power.

The power consumption profile of the electric appliance is, for example, the profile displayed by the smartphone 600 illustrated in FIG. 5. The above application is able to move the power consumption profile to time in the future by an operation of the user, and also simultaneously calculates and displays points at a time point when the power consumption profile is moved. The user reserves activation of the electric appliance while seeing the displayed points, and information on the reservation is notified to the server device to start monitoring power consumption of the home. In a case where there is consumption close to the reserved consumption profile at a time point when consumption reservation time has elapsed to terminate the consumption, the server device accumulates points displayed by the above application at the time of reservation, and causes the above application to display the accumulated points.

The points thus accumulated can be used, for example, as an incentive for an electricity bill in each home. By giving an incentive such as discounting an electricity bill by a predetermined amount to a home in which a predetermined number of points or more are saved within a predetermined period of time, it is possible to prompt each home to disperse time zones in which power is used.

Next, description is given of a functional configuration example of the power supply arbitration device 100 according to an embodiment of the present disclosure. FIG. 16 is an explanatory diagram illustrating the functional configuration example of the power supply arbitration device 100 according to an embodiment of the present disclosure.

As illustrated in FIG. 16, the power supply arbitration device 100 includes a communication unit 110, a control unit 120, and a storage unit 130.

The communication unit 110 communicates with other devices, e.g., the power meter 200 or the battery device 400, or the home electric appliance or the information processor such as a smartphone.

The control unit 120 is configured by a processor such as a CPU, for example, and executes processing related to the power supply in the power system including the processing described above related to the power supply arbitration.

For example, the control unit 120 registers the battery device 400 in the storage unit 130 on the basis of the registration information on the battery device 400 received by the communication unit 110. In addition, for example, the control unit 120 registers an electric appliance in the storage unit 130 on the basis of the registration information on the electric appliance, which is the power consumption device, received by the communication unit 110. In addition, for example, the control unit 120 stores, in the storage unit 130, a power consumption profile of the electric appliance, which is the power consumption device, received by the communication unit 110 in association with the electric appliance registered in the storage unit 130.

In addition, for example, in a case where a power request received by the communication unit 110 is requested from the electric appliance registered in the storage unit 130, the control unit 120 specifies a battery device 400 registered in the storage unit 130 as the battery device 400 that supplies the power requested by the registered electric appliance, on the basis of the power consumption profile associated with the registered electric appliance.

The storage unit 130 is configured by a storage device such as a hard disk drive, for example, and stores information related to the power supply in the power system including information to be used in the above-described processing related to the power supply arbitration.

It is to be noted that, in a case where the power supply arbitration device 100 executes the above-described point calculation for each home, the control unit 120 may execute processing of summation of the power amounts monitored by the power meter 200 or point addition/subtraction.

Subsequently, description is given of a functional configuration example of the battery device 400 according to an embodiment of the present disclosure. FIG. 17 is an explanatory diagram illustrating the functional configuration example of the battery device 400 according to an embodiment of the present disclosure.

As illustrated in FIG. 17, the battery device 400 includes a communication unit 410, a control unit 420, a storage unit 430, and a battery 440.

The communication unit 410 communicates with other devices, e.g., the power supply arbitration device 100 or the power meter 200, or the home electric appliance or the information processor such a smartphone.

The control unit 420 is configured by a processor such as a CPU, for example, and executes processing related to the power supply in the power system including the above-described processing related to the power supply. The control unit 420 has a timer function and has a function of starting or stopping supplying power at set time.

The storage unit 430 is configured by a storage device such as a hard disk drive, for example, and stores information related to the power supply in the power system including information to be used in the above-described processing related to the power supply.

The battery 440 includes, for example, a secondary battery, stores power generated by the solar cell 300 in the secondary battery, and discharges the power from the secondary battery under the control of the control unit 420.

The battery device 400 according to an embodiment of the present disclosure has such a configuration, to thereby make it possible to execute the power supply on the basis of information transmitted from the power supply arbitration device 100.

Subsequently, description is given of a functional configuration example of the smartphone 600 according to an embodiment of the present disclosure. FIG. 18 is an explanatory diagram illustrating the functional configuration example of the smartphone 600 according to an embodiment of the present disclosure.

As illustrated in FIG. 18, the smartphone 600 according to an embodiment of the present disclosure includes a communication unit 610, a control unit 620, a storage unit 630, a display unit 640, and an input unit 650.

The communication unit 610 communicates with other devices, e.g., the power supply arbitration device 100 and the power meter 200 as well as home electric appliances, and the like.

The control unit 620 is configured by a processor such as a CPU, for example, and executes processing related to the power supply in the power system including the above-described processing related to the power supply.

The storage unit 630 is configured by a storage device such as a nonvolatile memory, for example, and stores information related to the power supply in the power system including information to be used in the above-described processing related to the power supply.

The display unit 640 is configured by, for example, a liquid crystal display, an organic EL display, or the like, and displays various types of information.

The input unit 650 is configured by, for example, a button, a touch panel, and the like, and is used by a user of the smartphone 600 to perform operation inputs to the smartphone 600.

As described above, the smartphone 600 according to the present embodiment is able to acquire and display the power consumption profile of an electric appliance, issue an activation instruction to the electric appliance, and acquire and display points.

In a case where a plurality of loads exists in a single electric appliance, or in a case where a plurality of electric appliances may be possibly used simultaneously, the power consumption may fluctuate drastically. In such a case, supplying of power to the electric appliance from the battery enables the power reservation profile to be a profile that allows for charging of a low battery due to supplying power to the electric appliance. Accordingly, the supplying of power to the electric appliance from the battery makes it possible to simplify contents of the power reservation profile.

An example of one use case is illustrated. FIG. 19 is an explanatory diagram illustrating a configuration example of the power system according to an embodiment of the present disclosure. FIG. 19 illustrates one power domain 800 that includes three loads 810a to 810c, a battery 820, and an uninterruptible power system (UPS) 830. The uninterruptible power system 830 is an uninterruptible power system that outputs a current-limited direct current. The power domain 800 may be configured as a single electric appliance or may be a certain region in a single home. In a case where the power domain 800 is the certain region in a single home, the loads 810a to 810c may be electric appliances, or may be mobile bodies each provided with a battery, such as an electric vehicle or an electric motorcycle. The uninterruptible power system 830 is provided with a communication function, and communicates with another device, e.g., the power supply arbitration device 100, through an external network such as the Internet.

The uninterruptible power system 830 receives power supply from an AC grid line, and supplies power to the loads 810a to 810c and the battery 820. A circuit breaker 840 has a function of interrupting a current when a current of a predetermined value or more flows. In the present embodiment, the circuit breaker 840 interrupts a current when a current of 10 A or more flows.

The power domain 800 including a plurality of loads therein includes the battery 820 having a capacity slightly greater than an average power consumption amount, thus allowing for compensation for occurrence of rapid fluctuation in power consumption due to the loads 810a to 810c using power supply from the battery 820. When the power supply from the battery 820 advances to reduce a power storage amount of the battery 820, a simple power request profile is generated, in which a requested amount is flat, and power feeding is reserved to an external power supply device. This enables a current flowing through the AC grid line to be also leveled and stabilized and the contracted power to be also lowered to around the average power consumption, thus making it possible to compensate costs for operation of the battery 820.

FIG. 20 is an explanatory diagram illustrating a setting example of power consumptions of loads and power request profiles. For example, in a case where the three loads 810a to 810c shift time zones to consume power at levels of, respectively, 8 A, 6 A, and 7 A as illustrated in FIG. 20, the total consumption of the three loads exceeds 10 A greatly depending on time, thus resulting in interruption of a current by the circuit breaker 840. In addition, when setting a power request profile corresponding to the total power consumption amount of the loads 810a to 810c, the power request profile fluctuates drastically with time to correspond to the total consumption.

Therefore, in a case where the loads 810a to 810c consume power, the power domain 800 supplies power from the battery 820. When the power storage amount is reduced due to the power supply from the battery 820, as illustrated in FIG. 2, the power domain 800 generates a simple power request profile, in which a requested amount is flat, and reserves power feeding to an external power supply device. This power feeding reservation is sent to the power supply arbitration device 100 to determine a power supply device that supplies power by the battery 820. The charging of the battery 820 is performed, for example, in a time zone when power is not used by the loads 810a to 810c. In addition, the amount of current at that time is an amount of current to such an extent that interruption of a current by the circuit breaker 840 does not occur (e.g., 9 A).

Providing the battery 820 in the power domain 800 in this manner suppresses drastic power fluctuation in the AC grid line to simplify the power request profile generated by the power domain 800. In addition, a smart house having the battery 800 (a house that carries out power supply by a direct current) is also able to be incorporated, as an entire house, into the power system according to the present embodiment as the power consumption device. Aside from those described above, such a power domain 800 is also applicable to a data center or the like including many servers and backup batteries.

In a case where power usage by loads does not terminate even when the power storage amount of the battery 820 is further lowered and the remaining power storage amount is scarce, the power domain 800 may be switched to use power from the AC grid line. At this time, the power domain 800 may supply power from the AC grid line to the load, or may use the power from the AC grid line for charging of the battery to supply the load with the power stored in the battery 820.

2. CONCLUSION

As described above, according to an embodiment of the present disclosure, there are provided the power system that makes it possible for side of a power consumer to take initiative to stabilize a power grid and suppress peak power for the power consumer, and the power supply arbitration device 100, the battery device 400 and the electric appliance used in the power system, as well as the information processor that controls the devices used in the power system.

The respective steps in the series of processing to be executed by the devices described herein need not necessarily be processed in chronological order illustrated as the sequence diagram or the flowchart. For example, the respective steps in the series of processing executed by the devices may be processed in an order different from the order illustrated as the flowchart, or may be processed in parallel.

In addition, it is also possible to create a computer program to cause hardware, such as a CPU, a ROM, and a RAM built in respective devices, to exhibit functions equivalent to the configurations of the respective devices described above. In addition, it is also possible to provide a storage medium in which the computer program is stored. In addition, it is also possible to configure the respective functional blocks illustrated in the functional block diagrams to thereby implement the series of processing using the hardware.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In addition, the effects described herein are merely illustrative or exemplary, and are not limitative. That is, the technology according to the present disclosure may achieve, in addition to or in place of the above effects, other effects that are obvious to those skilled in the art from the description of the present specification.

It is to be noted that the technical scope of the present disclosure also includes the following configurations.

(1)

A power supply arbitration device including:

a control unit;

a communication unit that communicates with another device through a communication network; and a storage unit that stores information, the control unit registering a power supply device in the storage unit on a basis of power supply device registration information received by the communication unit, the control unit registering a power consumption device in the storage unit on a basis of power consumption device registration information received by the communication unit, the control unit storing a power consumption profile of the power consumption device received by the communication unit in the storage unit in association with the power consumption device registered in the storage unit, and in a case where a power request received by the communication unit is requested from the power consumption device registered in the storage unit, the control unit specifying the power supply device registered in the storage unit as a power feeding device that supplies power requested by the registered power consumption device on a basis of the power consumption profile associated with the registered power consumption device.

(2)

The power supply arbitration device according to (1), in which the control unit specifies power feeding information used by the power feeding device to perform power feeding and activation time information on the registered power consumption device, causes the communication unit to transmit the power feeding information to the power feeding device designated as a transmission destination, and causes the communication unit to transmit the activation time information to the power consumption device designated as a transmission destination.

(3)

The power supply arbitration device according to (1) or (2), in which the control unit specifies identification information used by the power feeding device and the power consumption device to control power reception and power feeding, and causes the communication unit to transmit the identification information to the power feeding device and the power consumption device designated as the transmission destinations.

(4)

The power supply arbitration device according to any one of (1) to (3), in which the control unit specifies a power feeding destination for a power reception request on a basis of information on coupling of power feeding grids among a power consumption device group including one or more of the power supply devices to be controlled and a power consumption device group including one or more of the power consumption devices and on a basis of information on a current capacity of each of the power feeding grids.

(5)

A power supply device including:

a control unit;

a communication unit that communicates with another device through a communication network; and a storage unit that stores information, the control unit causing the communication unit to transmit information for registration of an own device to a power supply arbitration device, which arbitrates power supply, designated as a transmission destination, and in a case where an inquiry about a power supply amount received by the communication unit is sent from the power supply arbitration device, the control unit causing the communication unit to transmit power supply amount information from the own device to the power supply arbitration device designated as the transmission destination.

(6)

The power supply device according to (5), further including a timer, in which the communication unit receives power feeding information used to supply power to a power consumption device that consumes power, and the control unit controls power feeding to the power consumption device on a basis of the power feeding information and time information on the timer.

(7)

The power supply device according to (5) or (6), in which the communication unit receives identification information used to control the power feeding, and the control unit controls the power feeding on a basis of the identification information.

(8)

A power consumption device including:

a control unit;

a communication unit that communicates with another device through a communication network; and a storage unit that stores information, the control unit causing the communication unit to transmit information for registration of an own device and a power consumption profile at the own device to a power supply arbitration device, which arbitrates power supply, designated as a transmission destination, and the control unit causing the communication unit to transmit a power request to the power supply arbitration device designated as the transmission destination.

(9)

The power consumption device according to (8), further including a timer, in which the communication unit receives activation time information, and the control unit controls activation of the own device on a basis of the activation time information and time information on the timer.

(10)

The power consumption device according to (8) or (9), in which the communication unit receives identification information used to control power reception, and the control unit controls the power reception on a basis of the identification information.

(11)

The power consumption device according to any one of (8) to (10), in which the control unit causes the communication unit to transmit transmission of the power request in such a state that power consumption is reserved.

(12)

The power consumption device according to any one of (8) to (11), in which the control unit causes the communication unit to transmit the transmission of the power request in such a state that the power consumption profile is updated.

(13)

A power supply remote controller including:
a display unit;
an input unit with which an instruction from a user is inputted;
a control unit;
a communication unit that communicates with another device through a communication network; and
a storage unit that stores information,
the control unit registering a power consumption device that consumes power in the storage unit on a basis of power consumption device registration information received by the communication unit,
the control unit storing a power consumption profile of the power consumption device received by the communication unit in the storage unit in association with the power consumption device registered in the storage unit,
the control unit causing the communication unit to transmit information for registration of the power consumption device and the power consumption profile to a power supply arbitration device, which arbitrates power supply, designated as a transmission destination, and
in a case where activation reservation for the power consumption device displayed on the display unit is selected by the input unit, the control unit causing the communication unit to transmit a power request for the power consumption device to the power supply arbitration device designated as the transmission destination.

(14)

The power supply remote controller according to (13), in which
the communication unit receives activation time information on the power consumption device, and
the control unit causes the communication unit to transmit information on activation of the power consumption device on a basis of the activation time information and time information on a timer provided in the power consumption device.

(15)

The power supply remote controller according to (12) or (13), in which
the communication unit receives activation time information on the power consumption device, and
the control unit causes the communication unit to transmit the activation time information to the power consumption device designated as a transmission destination.

(16)

The power supply remote controller according to any one of (13) to (15), in which
the communication unit receives identification information used by the power consumption device to control power reception, and
the control unit causes the communication unit to transmit the identification information to the power consumption device designated as the transmission destination.

(17)

The power supply remote controller according to any one of (13) to (16), in which the control unit causes the display unit to display the power consumption profile of the power consumption device read from storage unit in response to an operation of the input unit.

(18)

A power supply arbitration method including causing a processor to:
register a power supply device on a basis of received power supply device registration information;
register a power consumption device on a basis of received power consumption device registration information;
store a received power consumption profile of the power consumption device in association with the registered power consumption device; and
specify the power supply device registered as a power feeding device that supplies power requested by the registered power consumption device on a basis of the power consumption profile associated with the registered power consumption device in a case where a received power request is requested from the registered power consumption device.

(19)

A power system including:
a power supply arbitration device;
a power supply device that supplies power; and
a power consumption device that consumes power,
the power supply arbitration device including
a control unit,
a communication unit that communicates with another device through a communication network, and
a storage unit that stores information,
the control unit registering the power supply device in the storage unit on a basis of power supply device registration information received by the communication unit,
the control unit registering the power consumption device in the storage unit on a basis of power consumption device registration information received by the communication unit,
the control unit storing a power consumption profile of the power consumption device received by the communication unit in the storage unit in association with the power consumption device registered in the storage unit, and
in a case where a power request received by the communication unit is requested from the power consumption device registered in the storage unit, the control unit specifying the power supply device registered in the storage unit as a power feeding device that supplies power requested by the registered power consumption device on a basis of the power consumption profile associated with the registered power consumption device.

(20)

A power controller including:
a control unit;
a communication unit that communicates with another device through a communication network, and
a storage unit that stores information,
in a case where a power storage amount of a battery managed by an own device is larger than a predetermined amount, the control unit prioritizing discharging power to a load from the battery, and
in a case where the power storage amount of the battery managed by the own device is equal to or smaller than the predetermined amount, the control unit causing the communication unit to transmit a power request for the battery to a power supply arbitration device, which arbitrates power supply, designated as a transmission destination.

REFERENCE NUMERALS LIST

10 grid power line
100 power supply arbitration device 200 power meter
300 solar cell
400 battery device
500 power conditioner
510 microwave oven
520 electric kettle
530 timer switch box
600 smartphone

The invention claimed is:

1. A power supply arbitration device, comprising:
a communication unit;
a storage unit; and
a control unit is configured to:
  control the communication unit to receive power supply device registration information of a power supply device;
  control the communication unit to receive power consumption device registration information of a power consumption device and a power consumption profile of the power consumption device;
  register the power supply device in the storage unit based on the received power supply device registration information;
  register the power consumption device in the storage unit based on the received power consumption device registration information;
  control the storage unit to store the received power consumption profile of the registered power consumption device in association with the registered power consumption device;
  control the communication unit to receive a power request from the registered power consumption device, wherein the power request indicates a power requested by the registered power consumption device;
  select, based on the received power request, the registered power supply device as a power feeding device;
  generate a first ID for the power feeding device and a second ID for the registered power consumption device, wherein each of the first ID and the second ID is transitory and valid until power arbitration associated with the received power request;
  specify power feeding information for the power feeding device, wherein the power feeding information includes an activation time for the power feeding device to start supply of the power to the registered power consumption device;
  control the communication unit to transmit a pair of the generated first ID and the second ID to each of the power feeding device and the registered power consumption device; and
  control the communication unit to transmit the power feeding information to the power feeding device, wherein
    the first ID and the second ID enable synchronization of the activation time between the power feeding device and the registered power consumption device without the power supply arbitration device, and
    the first ID and the second ID enable extension of a power feeding time between the power feeding device and the registered power consumption device without the power supply arbitration device, when the received power consumption profile of the registered power consumption device changes.

2. The power supply arbitration device according to claim 1, wherein the control unit is further configured to specify a power feeding destination, for the power request, based on coupling information of a plurality of power feeding grids and current capacity information of each power grid of the plurality of power feeding grids.

3. A power supply device, comprising:
a communication unit; and
a control unit configured to:
  control the communication unit to transmit information for registration of the power supply device to a power supply arbitration device;
  control the communication unit to receive, from the power supply arbitration device, an inquiry about a power supply amount of the power supply device;
  control, based on the received inquiry, the communication unit to transmit power supply amount information to the power supply arbitration device;
  control the communication unit to receive, from the power supply arbitration device, a power consumption profile of a power consumption device, power feeding information, and identification information, wherein
    the power feeding information includes an activation time for the power supply device to start supply of power to the power consumption device,
    the identification information comprises a pair of a first ID of the power supply device and a second ID of the power consumption device,
    the identification information is transitory and valid until power arbitration associated with a power request received from the power consumption device,
    the identification information enables synchronization of the activation time between the power supply device and the power consumption device without the power supply arbitration device, and
    the identification information enables extension of a power feeding time between the power supply device and the power consumption device without the power supply arbitration device, when the received power consumption profile of the power consumption device changes; and
  control the supply of the power to the power consumption device based on the received power feeding information and the identification information.

4. The power supply device according to claim 3, further comprising a timer, wherein
the control unit is further configured to control the supply of the power to the power consumption device based on time information on the timer.

5. A power consumption device, comprising:
a communication unit; and
a control unit configured to:
  control the communication unit to transmit information for registration of the power consumption device and a power consumption profile of the power consumption device to a power supply arbitration device;
  control the communication unit to transmit a power request to the power supply arbitration device, wherein the power request indicates a power requested by the power consumption device;
  control the communication unit to receive power feeding information and identification information from the power supply arbitration device based on the transmitted power request, wherein the power feeding information includes an activation time for the power consumption device to start reception of power from a power supply device, the identification information comprises a pair of a first ID of the power supply device and a second ID of the power consumption device, the identification information is transitory and valid until power arbitration associated with the transmitted power request, the identification information enable synchronization of the activation time between the power supply device and the power consumption device without the power supply arbitration device, and the identification information enables extension of a power feeding time between the power supply device and the registered power consumption device without the power supply arbitration device, when the transmitted power consumption profile changes; and control activation of the power consumption device at the activation time based on the received power feeding information.

6. The power consumption device according to claim 5, further comprising a timer, wherein the control unit is further configured to control the activation of the power consumption device based on time information on the timer.

7. The power consumption device according to claim 5, wherein the control unit is further configured to control the communication unit to transmit the power request based on a power consumption reserved state of the power consumption device.

8. The power consumption device according to claim 5, wherein the control unit is further configured to control the communication unit to transmit the power request based on a state of the power consumption device, and the state indicates that the power consumption profile is updated.

9. A power supply remote controller, comprising:
a display unit;
an input unit;
a communication unit;
a storage unit; and,
a control unit configured to:
  control the communication unit to receive power consumption device registration information from a power consumption device;
  register, in the storage unit, the power consumption device based on the received power consumption device registration information;
  control the communication unit to receive a power consumption profile of the registered power consumption device;
  control the storage unit to store the received power consumption profile of the registered power consumption device in association with the registered power consumption device;
  control the communication unit to transmit information for registration of the power consumption device and the power consumption profile to a power supply arbitration device;
  control the display unit to display activation reservation information for the registered power consumption device;
  control the input unit to receive selection of the displayed activation reservation information;

control, based on the selection, the communication unit to transmit a power request to the power supply arbitration device, wherein the power request indicates a power requested by the registered power consumption device;

control the communication unit to receive, based on the transmitted power request, activation time information and identification information from the power supply arbitration device, wherein the activation time information indicates an activation time for the registered power consumption device to start reception of the power from a power supply device, the identification information comprises a pair of a first ID of the power supply device and a second ID of the registered power consumption device, the identification information is transitory and valid until power arbitration associated with the transmitted power request, the identification information is for identification of the registered power consumption device and to enable synchronization of the activation time information between the power supply device and the registered power consumption device, and the identification information enables extension of a power feeding time between the power supply device and the registered power consumption device without the power supply arbitration device, when the received power consumption profile of the registered power consumption device changes; and control the communication unit to transmit the received identification information to the registered power consumption device.

10. The power supply remote controller according to claim 9, wherein the control unit is further configured to control the communication unit to transmit the activation time information based on a timer of the registered power consumption device.

11. The power supply remote controller according to claim 9, wherein the control unit is further configured to:
  control the input unit to receive an operation;
  read, from the storage unit, the power consumption profile of the registered power consumption device based on the received operation; and
  control the display unit to display the read power consumption profile of the registered power consumption device.

12. A power supply arbitration method, comprising:
receiving power supply device registration information of a power supply device;
receiving power consumption device registration information of a power consumption device and a power consumption profile of the power consumption device;
registering the power supply device based on the received power supply device registration information;
registering the power consumption device based on the received power consumption device registration information;
controlling storage of the received power consumption profile of the registered power consumption device in association with the registered power consumption device;

receiving a power request from the registered power consumption device, wherein the power request indicates a power requested by the registered power consumption device;
selecting, based on the received power request, the registered power supply device as a power feeding device;
generating a first ID for the power feeding device and a second ID for the registered power consumption device, wherein each of the first ID and the second ID is transitory and valid until power arbitration associated with the received power request;
specifying power feeding information for the power feeding device, wherein the power feeding information includes an activation time for the power feeding device to start supplying the power to the registered power consumption device;
transmitting a pair of the generated first ID and the second ID to each of the power feeding device and the registered power consumption device; and
transmitting the power feeding information to the power feeding device, wherein
the first ID and the second ID enable synchronization of the activation time between the power feeding device and the registered power consumption device without a power supply arbitration device, and
the first ID and the second ID enable extension of a power feeding time between the power feeding device and the registered power consumption device without the power supply arbitration device, when the received power consumption profile of the registered power consumption device changes.

13. A power system, comprising:
a power supply arbitration device;
a power supply device configured to supply power; and
a power consumption device configured to receive the power, wherein the power supply arbitration device comprises:
    a communication unit;
    a storage unit; and
    a control unit configured to:
        control the communication unit to receive power supply device registration information of the power supply device;
        control the communication unit to receive power consumption device registration information of the power consumption device and a power consumption profile of the power consumption device;
        register the power supply device in the storage unit based on the received power supply device registration information;
        register the power consumption device in the storage unit based on the received power consumption device registration information;
        control the storage unit to store the received power consumption profile of the registered power consumption device in association with the registered power consumption device;
        control the communication unit to receive a power request from the registered power consumption device, wherein the power request indicates a power requested by the registered power consumption device;
        select based on the received power request, the registered power supply device as a power feeding device;
        generate a first ID for the power feeding device and a second ID for the registered power consumption device, wherein each of the first ID and the second ID is transitory and valid until power arbitration associated with the received power request;
        specify power feeding information for the power feeding device, wherein the power feeding information includes an activation time for the power feeding device to start supply of the power to the registered power consumption device;
        control the communication unit to transmit a pair of the generated first ID and the second ID to each of the power feeding device and the registered power consumption device; and
        control the communication unit to transmit the power feeding information to the power feeding device, wherein
    the first ID and the second ID enable synchronization of the activation time between the power feeding device and the registered power consumption device without the power supply arbitration device, and
    the first ID and the second ID enable extension of a power feeding time between the power feeding device and the registered power consumption device without the power supply arbitration device, when the received power consumption profile of the registered power consumption device changes.

* * * * *